US010645856B2

(12) United States Patent
Stovall et al.

(10) Patent No.: US 10,645,856 B2
(45) Date of Patent: May 12, 2020

(54) REMOTE HYDRAULIC ACTUATION AND POSITIONING OF A PLURALITY OF IMPLEMENT STABILIZER WHEELS

(71) Applicant: CNH Industrial America LLC, New Holland, PA (US)

(72) Inventors: Christopher Stovall, Chicago, IL (US); Kena Shah, Woodbridge, IL (US); Timothy R. Blunier, Danvers, IL (US)

(73) Assignee: CNH Industrial America LLC, New Holland, PA (US)

( * ) Notice: Subject to any disclaimer, the term of this patent is extended or adjusted under 35 U.S.C. 154(b) by 368 days.

(21) Appl. No.: 15/581,331

(22) Filed: Apr. 28, 2017

(65) Prior Publication Data
US 2018/0310460 A1 Nov. 1, 2018

(51) Int. Cl.
| | | |
|---|---|---|
| *A01B 63/22* | (2006.01) | |
| *A01B 79/00* | (2006.01) | |
| *A01B 76/00* | (2006.01) | |
| *A01B 49/02* | (2006.01) | |
| *A01B 73/02* | (2006.01) | |

(52) U.S. Cl.
CPC ............ *A01B 63/22* (2013.01); *A01B 79/005* (2013.01); *A01B 49/027* (2013.01); *A01B 73/02* (2013.01); *A01B 76/00* (2013.01)

(58) Field of Classification Search
CPC ..... A01B 63/111; A01B 63/114; A01B 63/16; A01B 63/22; A01B 79/005; A01B 33/087
See application file for complete search history.

(56) References Cited

U.S. PATENT DOCUMENTS

| | | | |
|---|---|---|---|
| 4,139,065 A | | 2/1979 | Lewison |
| 4,176,721 A | | 12/1979 | Poggemiller et al. |
| 4,221,266 A | | 9/1980 | Fardal |
| 4,354,688 A | | 10/1982 | Swanson |
| 4,379,491 A | | 4/1983 | Riewerts et al. |
| 4,413,685 A | | 11/1983 | Gremelspacher et al. |
| 4,825,655 A | | 5/1989 | Buchl et al. |
| 5,957,218 A | * | 9/1999 | Noonan ................. A01B 63/10 172/239 |
| 6,125,775 A | | 10/2000 | Gust |
| 6,129,157 A | * | 10/2000 | Noonan ................. A01B 63/10 172/239 |

(Continued)

FOREIGN PATENT DOCUMENTS

WO        2004/004439        1/2004

OTHER PUBLICATIONS

EP 18167591.9, Extended European Search Report dated Oct. 5, 2018, 7 pages.

*Primary Examiner* — Matthew Troutman
(74) *Attorney, Agent, or Firm* — Rebecca L. Henkel; Rickard K. DeMille

(57) ABSTRACT

A system, apparatus and method for remotely and individually controlling a plurality of remotely positionable stabilizer wheels of a towable agricultural implement utilize an electronic control unit that receives an input signal indicative of a desired position of the stabilizer wheel, and/or a desired depth of penetration of tillage tools operatively attached to the front and rear of the implement frame, to automatically and individually control a plurality of hydraulic positioning cylinders for individually positioning and holding the plurality of stabilizer wheel at the desired position of the stabilizer wheels.

20 Claims, 9 Drawing Sheets

(56) References Cited

U.S. PATENT DOCUMENTS

| | | | |
|---|---|---|---|
| 6,164,385 A | 12/2000 | Buchl | |
| 6,216,794 B1 * | 4/2001 | Buchl | A01B 63/00 111/903 |
| 6,220,366 B1 * | 4/2001 | Noonan | A01B 73/046 172/311 |
| 6,382,326 B1 * | 5/2002 | Goins | A01B 63/145 172/239 |
| 6,401,832 B1 * | 6/2002 | Payne | A01B 63/22 172/238 |
| 6,594,978 B2 | 7/2003 | Viaud | |
| 6,698,523 B2 * | 3/2004 | Barber | A01B 63/22 172/239 |
| 6,701,857 B1 | 3/2004 | Jensen et al. | |
| 6,810,968 B2 | 11/2004 | Myers | |
| 8,688,333 B2 | 4/2014 | Ryder et al. | |
| 8,763,717 B2 | 7/2014 | Kovach et al. | |
| 8,838,346 B1 | 9/2014 | Griffin | |
| 8,857,530 B2 | 10/2014 | Henry | |
| 8,909,435 B2 | 12/2014 | Tuttle et al. | |
| 9,148,988 B2 | 10/2015 | Baker | |
| 9,307,688 B2 * | 4/2016 | Adams | A01C 7/203 |
| 2004/0016556 A1 * | 1/2004 | Barber | A01B 63/22 172/452 |
| 2008/0110649 A1 | 5/2008 | Connell et al. | |
| 2012/0227992 A1 * | 9/2012 | Henry | A01B 63/114 172/4 |
| 2013/0032363 A1 | 2/2013 | Curry et al. | |
| 2015/0156948 A1 * | 6/2015 | Henry | A01B 63/22 172/1 |
| 2015/0230391 A1 | 8/2015 | Houck | |
| 2015/0264857 A1 | 9/2015 | Achen et al. | |
| 2016/0113200 A1 | 4/2016 | Gofron et al. | |
| 2016/0212929 A1 | 7/2016 | Wileniec et al. | |

\* cited by examiner

REMOTE HYDRAULIC ACTUATION AND POSITIONING OF A PLURALITY OF IMPLEMENT STABILIZER WHEELS

FIELD OF THE INVENTION

This invention relates generally to towable agricultural implements such as tillage equipment and other wide implements, towed behind a towing vehicle such as a tractor, and more specifically to stabilizer wheels utilized in such implements.

BACKGROUND OF THE INVENTION

Modern farming practices often utilize towable agricultural tillage implements to prepare a seedbed providing optimal conditions for subsequent planting of seed in the seedbed, proper germination and growth of the seed, and conservation of the soil in and below the seedbed. Such implements are configured to provide a seedbed having a number of desirable conditions, including a uniform controlled depth, a flat and smooth floor at the bottom of the seedbed, and a relatively even surface finish.

To cover large acreages as quickly and efficiently as possible, modern towable tillage implements, such as disks and field cultivators, are often very wide, with tillage widths of 22 to 47 feet being common. In order to allow such wide implements to be towed behind a towing vehicle on public roadways, these implements typically are built with frames having a central main frame section and multiple wing sections joined to the main frame by hinged joints, so that the wing sections can be folded up over the main frame section to narrow the width of the implement for transport on public roadways. In addition, the frames of such implements are also intentionally built to allow a limited amount of flexing to occur across the width of the implement during tillage operations, so that tillage tools attached to the frame can better follow variations in the terrain of the ground being filled.

The hinged joints and inherent flexibility between the main and wing sections of the frame of such implements sometimes leads to undesirable bouncing of the wings, or an undesirable tendency of the outer edges of the tillage tools to dig deeper than desired into the ground surface, particularly while turning or maneuvering around obstacles. The wider the implement, the worse this problem becomes.

In order to counteract the tendency of wide tillage implements to undesirably bounce or dig into the ground surface, some tillage implements utilize so-called stabilizer wheels along outer extremities of the implement. These stabilizer wheels ride on or close to the ground surface, to damp any bouncing tendencies, and to provide additional support to preclude having the outer ends of the tillage tools dig too deeply into the ground surface during turning or maneuvering the wide tillage implement around obstacles during tillage operations.

Generally speaking, such stabilizer wheels are properly initially adjusted to bear only lightly on the ground surface, until they come into play for reducing bouncing or digging in of the tillage tools. They do not typically function to provide primary support of the implement or primary depth control for the tillage tools. Primary support and depth control are typically provided by support and transport wheels of the implement.

For proper operation of the implement, it is necessary for the stabilizer wheels to be positioned properly with respect to the implement frame, so that the stabilizer wheels can perform their necessary function without interfering with primary depth control and leveling of the tillage tools fore and aft, and across the width of the implement. If the stabilizer wheels are extended too far, or press too hard against the ground surface, the resulting lifting effect on the implement frame will interfere with proper operation of the tillage tools, and seedbed quality will be degraded. As changes are made to the depth of tillage, therefore, the stabilizer wheels must also be adjusted in a corresponding manner to keep the implement operating optimally.

In addition, it may be desirable to retract the stabilizer wheels during certain tillage operations and under certain operating conditions. It is also typically desirable that the stabilizer wheels be retracted prior to and during initial set up and subsequent adjustments to the operating depth and level or trim condition of the tillage tools. Following such set up and adjustments, the stabilizer wheels must be returned to a proper position and degree of ground pressure.

In the past, positioning of stabilizer wheels has typically been accomplished through the use of manually operated turnbuckles or screw jacks, by an operator or an operator's assistant standing on the ground. Alternatively, manually operated hydraulic cylinders have been used to position the stabilizer wheels on some tillage implements.

While these prior manual approaches have been successful in the past, they are more cumbersome, undesirably time-consuming—particularly where an operator's assistant is needed—and, prone to adjustment error. Prior approaches are also not amenable to simultaneously positioning multiple stabilizer wheels in implements having a plurality of stabilizer wheels. Further improvement is desirable.

It is especially desirable to provide an approach simultaneously and individually positioning stabilizer wheels that can be carried out remotely by an operator seated in the towing vehicle, without the need for the operator to dismount from the towing vehicle, and without having an assistant on the ground. It is also desirable to provide an approach that allows the stabilizer wheels to be automatically, rather than manually, positioned in response to a simple command from an operator in the cab of the towing vehicle. It is further desirable that the stabilizer wheels be automatically adjusted in response to changes in depth of tillage. It is yet further desirable that an improved approach provide capability for remote, automatic and tillage-depth-responsive adjustment of stabilizer wheel position to be carried out on-the-fly, without the necessity for stopping the towing vehicle, or for the vehicle operator's attention to be diverted from overall operation of the towing vehicle to manually adjust stabilizer wheel position.

SUMMARY OF THE INVENTION

The invention provides a system, apparatus and method for remotely and individually controlling a plurality of remotely positionable stabilizer wheels of a towable agricultural implement, utilizing an electronic control unit that receives an input signal indicative of a desired position of the stabilizer wheel, and/or a desired depth of penetration of tillage tools operatively attached to the front and rear of the implement frame, to automatically and individually control a plurality of hydraulic positioning cylinders to individually position and hold the plurality of stabilizer wheel at the desired position of the stabilizer wheels.

Some forms of the invention provide multiple remotely positionable stabilizer wheel arrangements for a towable agricultural implement which utilize a common electronic control unit that receives an input signal indicative of a desired position of the multiple stabilizer wheels, and/or a desired depth of penetration of tillage tools operatively attached to a frame of the implement. The common electronic control unit controls hydraulic positioning cylinders of each of the remotely positionable stabilizer wheel arrangements to position and hold the stabilizer wheels at the desired position of the stabilizer wheels.

Some forms of the invention provide a system for remotely and individually positioning first and second remotely positionable stabilizer wheels that are operatively attached to a frame of an agricultural tillage implement, where the implement has an implement frame supported above a ground surface by implement support wheels that are operatively connected to the frame by a depth control arrangement. The system for remotely and individually positioning a plurality of remotely positionable stabilizer wheels may include a first stabilizer wheel control arrangement, a second stabilizer wheel control arrangement, and an all-wheel control arrangement.

Each of the first and second stabilizer wheel control arrangements and the all-wheel control arrangement include rod-end and cylinder-end connections. Theses rod-end and cylinder-end connections, respectively, are all joined together in fluid communication with one another, in a parallel circuit arrangement, with their respective rod-end connections in fluid communication with one another and their respective cylinder-end connections in fluid communication with one another.

The first stabilizer wheel control arrangement includes a first double-acting hydraulic cylinder that is operatively connectable to the first remotely positionable stabilizer wheel for respectively positioning the first stabilizer wheel, through extension and retraction of the first hydraulic cylinder. The first double-acting hydraulic cylinder has a cylinder-end hydraulic port and a rod-end hydraulic port that are disposed on opposite sides of a piston of the first hydraulic cylinder, and connected respectively in series with the cylinder-end and rod-end connections of the first stabilizer wheel control arrangement.

The first stabilizer wheel control arrangement further includes a solenoid-operated first cylinder shut-off valve arrangement and a first cylinder flow restrictor, that are disposed in a series relationship with one another, the first cylinder, and one of the cylinder-end and rod-end connections of the first stabilizer wheel control arrangement.

In similar fashion, the second stabilizer wheel control arrangement includes a second double-acting hydraulic cylinder that is operatively connectable to the second remotely positionable stabilizer wheel for respectively positioning the second stabilizer wheel, through extension and retraction of the second hydraulic cylinder. The second double-acting hydraulic cylinder has a cylinder-end hydraulic port and a rod-end hydraulic port disposed on opposite sides of a piston of the second hydraulic cylinder. The cylinder-end and rod-end ports of the second cylinder are connected respectively in series with the cylinder-end and rod-end connections of the second stabilizer wheel control arrangement.

The second stabilizer wheel control arrangement further includes a solenoid-operated second cylinder shut-off valve arrangement and a second cylinder flow restrictor disposed in a series relationship with one another, the second cylinder, and one of the cylinder-end and rod-end connections of the second stabilizer wheel control arrangement.

The all-wheel control arrangement is solenoid operated and configured for selectively supplying a pressurized flow of hydraulic fluid to the first and second cylinders in a first direction to thereby cause extension of the cylinders, and is further configured for supplying a pressurized flow of hydraulic fluid to the first and second cylinders in an opposite direction to thereby cause retraction of the cylinders.

The first and second cylinder shut-off arrangements are selectively and individually operable independent of the all-wheel control arrangement, to thereby stop the flow of hydraulic fluid through the first and second cylinders respectively, for controlling the position of the first and second stabilizer wheels respectively.

Some forms of a system for remotely and individually positioning a plurality of remotely positionable stabilizer wheels, according to the invention further include an electronic control unit operatively connected to the solenoids of the first and second cylinder shut-off valve arrangements, and the solenoid of the all-wheel control arrangement, for individually controlling extension and retraction of the first and second hydraulic cylinders through selective actuation of the solenoids of the first and second shut-off valves and the solenoid of the all-wheel control valve.

In some forms of the invention, some components of the first and second cylinder shut-off arrangements, and some components of the all-wheel control arrangement, may be packaged together in a common hydraulic power source. The invention may also take the form of an agricultural tillage implement incorporating a system as described above, or a method for operating a system as described above.

In one form of the invention, a system is provided for remotely and individually positioning first and second remotely positionable stabilizer wheels operatively attached to a frame of an agricultural tillage implement having an implement frame supported above a ground surface by implement support wheels operatively connected to the frame by a depth control arrangement. The system includes first and second double-acting cylinders, and a hydraulic power source including a four-way solenoid-operated extend/retract valve, a first cylinder two-way solenoid-operated shut-off valve, a second cylinder two-way solenoid-operated shut off valve, a first cylinder restrictor orifice, and a second cylinder restrictor orifice.

The first double-acting hydraulic cylinder, is operatively connected to the first remotely positionable stabilizer wheel, for respectively positioning the first stabilizer wheel through extension and retraction of the first hydraulic cylinder, and has a cylinder-end hydraulic port and a rod-end hydraulic port disposed on opposite sides of a piston of the first hydraulic cylinder. The second double acting hydraulic cylinder is operatively connected to the second remotely positionable stabilizer wheel, for respectively positioning the second stabilizer wheel through extension and retraction of the second hydraulic cylinder and has a cylinder-end hydraulic port and a rod-end hydraulic port disposed on opposite sides of a piston of the second hydraulic cylinder. The first and second hydraulic cylinders also have their respective rod-end ports connected together with one another in fluid communication, and their respective cylinder-end ports connected together with one another in fluid communication, to thereby form a parallel fluid circuit between the first and second cylinders.

The four-way valve includes pressure and return ports adapted respectively to receive pressurized hydraulic fluid from a source of pressurized hydraulic fluid, and for returning pressurized hydraulic fluid to the source of pressurized hydraulic fluid. The four-way valve also includes first and second supply/return ports that are operatively and selectively connectable in fluid communication directly to the pressure and return ports of the four-way valve in a straight-through condition of the solenoid valve, and alternatively operatively and selectively cross-connectable in fluid communication to the return and pressure ports of the four-way valve in a cross-connected position of the four-way valve.

One of the first and second supply/return ports of the four-way valve is connected in fluid communication with the rod-end ports of the first and second cylinders, and the other of the first and second supply/return ports of the four-way valve is connected in fluid communication with the cylinder-end ports of the first and second cylinders. By virtue of these connections, the four-way valve functions as a selective raise and lower control valve for both the first and second stabilizer wheels.

The first and second two-way valves each include first and second ports of the two-way valves. The first and second two-way valves are each internally configured such that, in a first position of the two-way valve, the first and second ports are open to one another in fluid communication to thereby allow fluid flow through the two-way valve. The first and second two-way valves are each further internally configured such that, in a second position of the two-way valves, fluid flow through the two-way valve from the first to the second ports is blocked.

The first cylinder two-way valve and the first cylinder restrictor orifice are connected in a series fluid circuit with one another and only the first cylinder, to thereby function as a first cylinder shut-off valve. And, the second cylinder two-way valve and the second cylinder restrictor orifice are connected in a series fluid circuit with one another and only the second cylinder to thereby function as a second cylinder shut-off valve.

A system for remotely and individually positioning a plurality of remotely positionable stabilizer wheels, according to the invention, may further include an electronic control unit operatively connected to the solenoids of the first cylinder two-way solenoid operated valve, the second cylinder two-way operated valve, and the solenoid of the four-way valve, for individually controlling extension and retraction of the first and second hydraulic cylinders through selective actuation of the solenoids of the first and second two-way valves and the solenoid of the four-way valve.

A system for remotely and individually positioning a plurality of remotely positionable stabilizer wheels, according to the invention, may include a first stabilizer wheel position sensor operatively connected to provide an electrical signal indicative of a first stabilizer wheel present position to the electronic control unit, and a second stabilizer wheel position sensor operatively connected to provide an electrical signal indicative of a second stabilizer wheel present position to the electronic control unit. The electronic control unit may be configured for receiving a desired stabilizer wheel position input signal, and is further configured for individually controlling extension and retraction of the first and second cylinders to provide a present stabilizer wheel position for the each of the first and second stabilizer wheels that matches the desired stabilizer wheel position input. In some forms of the invention, the electronic control unit is configured for receiving a desired depth input signal, and is further configured for individually controlling extension and retraction of the first and second cylinders to provide a present stabilizer wheel position for the each of the first and second stabilizer wheels that corresponds to the desired depth input signal.

In some forms of the invention, the electronic control unit of a system for remotely and individually positioning a plurality of remotely positionable stabilizer wheels is configured to receive first and second desired stabilizer wheel position input signals corresponding to the first and second stabilizer wheels respectively, and is further configured for individually controlling extension and retraction of the first and second cylinders to provide a present stabilizer wheel position for the each of the first and second stabilizer wheels that matches the first and second desired stabilizer wheel position inputs respectively.

In some forms of the invention, the electronic control unit of a system for remotely and individually positioning a plurality of remotely positionable stabilizer wheels selects a predetermined stabilizer wheel position for the first and second stabilizer wheels corresponding to the desired depth input and controls the hydraulic power source using the predetermined stabilizer wheel position. In other forms of the invention, the electronic control unit of a system for remotely and individually positioning a plurality of remotely positionable stabilizer wheels computes a computed desired stabilized wheel position for the first and second stabilizer wheels corresponding to the desired depth input, and controls the hydraulic power source using the computed desired stabilizer wheel position.

The invention may take the form of a towable agricultural tillage implement adapted for attachment to a towing vehicle and having an implement frame supported above a ground surface by implement support wheels operatively connected to the frame by a depth control arrangement to thereby control a depth of penetration below the ground surface of tillage tools attached to the frame. The towable agricultural implement may include first and second stabilizer wheel arrangements attached to frame in a manner providing selective stabilizing support of the implement, and a system for remotely and individually positioning the first and second remotely positionable stabilizer wheels, and a system for remotely and individually positioning the first and second remotely positionable stabilizer wheels according to the invention.

The invention may include one or more remotely positionable stabilizer wheel arrangements for an agricultural tillage implement having an implement frame supported above a ground surface by implement support wheels operatively connected to the frame by a depth control arrangement. The stabilizer wheel arrangement may include a support strut, a support strut bracket, a stabilizer wheel, a hydraulic cylinder, a hydraulic power source, a stabilizer wheel position sensor, and an electronic control unit.

The support strut may have a first end thereof adapted for mounting the stabilizer wheel to the support strut, with the stabilizer wheel being operatively attached to the first end of the strut in a manner that allows the stabilizer wheel to engage a ground surface to be tilled by the implement. The support strut bracket is adapted for attachment to the implement frame and for slidable engagement with a second end of the support strut, in a manner allowing the stabilizer wheel to operatively contact the ground surface. A first end of the hydraulic cylinder may be operatively attached to the support strut, and a second end of the cylinder may be operatively attached to the support strut bracket, for extension and retraction of the strut with respect to the strut bracket by corresponding extension and retraction of the hydraulic cylinder, to thereby lower and raise the stabilizer wheel in to and out of contact with the ground surface.

The position sensor, of the remotely positionable stabilizer wheel arrangement, may be operatively connected between the strut and the strut bracket for indicating a present linear position of the strut with respect to the strut bracket, and generating an electrical signal indicative of a present wheel position with respect to the strut bracket. The hydraulic power source may be operatively connected to the hydraulic cylinder for controlling extension and retraction of the cylinder in response to a cylinder control electrical signal.

The electronic control unit, of the remotely positionable stabilizer wheel arrangement, may be operatively connected to the position sensor and the hydraulic power source to receive the present position signal from the position sensor, and configured to receive a desired stabilizer wheel position input. The electronic control unit may be further configured for providing the cylinder control electrical signal to the hydraulic power source, to thereby cause the hydraulic cylinder to move the stabilizer wheel to, and hold the stabilizer wheel at the desired stabilizer wheel position.

In some forms of a remotely positionable stabilizer wheel arrangement, according to the invention, the control unit selects a predetermined stabilizer wheel position corresponding to the desired stabilizer wheel position input and controls the hydraulic power source using the predetermined stabilizer wheel position. In other forms of the invention, the control unit may compute a computed desired stabilized wheel position corresponding to the desired stabilizer wheel position input and control the hydraulic power source using the computed desired stabilizer wheel position. In some forms of the invention, the electronic control unit may be configured to control the stabilizer wheel in response to a desired stabilizer wheel position input signal calling for an incremental adjustment to a previous desired stabilizer wheel position.

In some forms of a remotely positionable stabilizer wheel arrangement, according to the invention, the electronic control unit may be yet further configured for receiving a desired depth electrical signal, computing a computed desired position of the stabilizer wheel, and providing a cylinder control signal corresponding to the computed desired position of the stabilized wheel to the hydraulic power unit, to thereby cause the hydraulic cylinder to move the stabilizer wheel to, and hold the stabilizer wheel at the computed desired stabilizer wheel position. The electronic control unit may be configured to select a predetermined stabilizer wheel position corresponding to the desired depth electrical signal, and controlling the hydraulic power source using the selected predetermined stabilizer wheel position. In some forms of the invention the control unit may compute a computed desired stabilized wheel position corresponding to the desired depth input and control the hydraulic power source using the computed desired stabilizer wheel position. The desired depth input may be an incremental adjustment to a previous desired depth of penetration, in some forms of the invention.

In some forms of a remotely positionable stabilizer wheel arrangement, according to the invention, the first end of the stabilizer wheel strut may include a pivot bracket for operatively connecting the stabilizer wheel to the strut, with the pivot bracket defining a substantially horizontally extending rolling axis of the stabilizer wheel, and also defining a non-horizontal pivot axis of the stabilizer wheel, such that the stabilizer wheel can simultaneously rotate about the rolling axis and pivot about the pivot axis.

The invention may also take the form of a towable agricultural tillage implement adapted for attachment to a towing vehicle, and having one or more remotely positionable stabilizer wheel arrangements, according to the invention. Such an implement may include a frame supported above a ground surface by implement support wheels operatively connected to the frame by a depth control arrangement, to thereby control a depth of penetration below the ground surface of tillage tools attached to the frame, and one or more stabilizer wheel arrangements, according to the invention, attached to the frame in a manner providing selective stabilizing support of the implement.

Each of the one or more remotely positionable stabilizer wheel arrangements, in a towable tillage implement according to the invention, may take any of the forms described above, with respect to aspects of the invention in the form of a remotely positionable stabilizer wheel arrangement according to the invention.

In forms of an implement according to the invention, having a plurality of stabilizer wheel arrangements attached to the frame, one or more of the plurality of remotely positionable stabilizer wheel arrangements may be operatively connected to a common electronic control unit to be collectively controlled thereby. In forms of an implement, having a plurality of stabilizer wheel arrangements attached to the frame, according to the invention, one or more of the plurality of stabilizer wheel arrangements may be operatively connected to a common electronic control unit to be individually controlled by the common electronic control unit.

In forms of an implement, according to the invention, having a plurality of stabilizer wheel arrangements attached to the frame, one or more of the plurality of stabilizer wheel arrangements attached to the frame may be operatively connected to a common electronic control unit and a common hydraulic power source to be collectively controlled by the common electronic control unit and the common hydraulic power supply.

The invention may also take the form of a method for remotely positioning a stabilizer wheel arrangement according to the invention, in an agricultural tillage implement according to the invention. Such a method may include the steps of: operatively attaching a first end of a hydraulic cylinder to the support strut, and a second end of the hydraulic cylinder to the support strut bracket for extension and retraction of the strut with respect to the strut bracket by corresponding extension and retraction of the hydraulic cylinder to thereby lower and raise the stabilizer wheel in to, and out of contact with the ground surface; operatively connecting a position sensor between the strut and the strut bracket for indicating a present linear position of the strut with respect to the strut bracket, and generating an electrical signal indicative of a present stabilizer wheel position with respect to the strut bracket; operatively connecting a hydraulic power source to the hydraulic cylinder for controlling extension and retraction of the cylinder in response to a cylinder control electrical signal; and operatively connecting an electronic control unit to the position sensor and the hydraulic power source to receive the present position signal and a desired stabilizer wheel position input, and to provide the cylinder control electrical signal to the hydraulic power source, to thereby cause the hydraulic cylinder to move the stabilizer wheel to, and hold the stabilizer wheel at the desired stabilizer wheel position.

In some forms of a method according to the invention, where the implement includes a plurality of remotely positionable stabilizer wheel arrangements attached to the frame, and the method may further include, operatively connecting the plurality of stabilizer wheel arrangements to a common electronic control unit to be collectively controlled by the common electronic control unit. In other forms of a method according to the invention, where the implement includes a plurality of remotely positionable stabilizer wheel arrangements attached to the frame, the method may include, operatively connecting the plurality of stabilizer wheel arrangements to a common electronic control unit, and collectively controlling the plurality of remotely positionable stabilizer wheel arrangements with the common electronic control unit.

The invention may take the form of a method for remotely and individually positioning first and second remotely positionable stabilizer wheels operatively attached to a frame of an agricultural tillage implement having an implement frame supported above a ground surface by implement support wheels operatively connected to the frame by a depth control arrangement, the method for remotely individually positioning a plurality of remotely positionable stabilizer wheels. The method may include the steps of: operatively connecting a first double-acting hydraulic cylinder to the first remotely positionable stabilizer wheel for respectively positioning the first stabilizer wheel through extension and retraction of the first hydraulic cylinder, and having a cylinder-end hydraulic port and a rod-end hydraulic port disposed on opposite sides of a piston of the first hydraulic cylinder; operatively connecting a second double acting hydraulic cylinder to the second remotely positionable stabilizer wheel for respectively positioning the second stabilizer wheel through extension and retraction of the second hydraulic cylinder and having a cylinder-end hydraulic port and a rod-end hydraulic port disposed on opposite sides of a piston of the second hydraulic cylinder; and, providing a hydraulic power source including a four-way solenoid-operated valve, a first cylinder two-way solenoid-operated shut-off valve, a second cylinder two-way solenoid-operated shut off valve, a first cylinder restrictor orifice, and a second cylinder restrictor orifice; where the four-way valve having pressure and return ports of the four way valve are adapted respectively to receive pressurized hydraulic fluid from a source of pressurized hydraulic fluid, and for returning pressurized hydraulic fluid to the source of pressurized hydraulic fluid; with the four-way valve also having first and second supply/return ports that are operatively and selectively connectable in fluid communication directly to the pressure and return ports of the four-way valve in a straight-through condition of the solenoid valve, and operatively and selectively cross-connectable in fluid communication to the return, and pressure ports of the four-way valve in a cross-connected position of the four-way valve; with the first and second two-way valves each having first and second ports thereof; with the first and second two-way valves each being internally configured such that in a first position of the two-way valves, the first and second ports are open to one another in fluid communication to thereby allow fluid flow through the two-way valve, and each being further internally configured such that in a second position thereof fluid flow through the two-way valve from the first to the second ports is blocked; connecting together the respective rod-end ports of the first and second hydraulic cylinders in fluid communication with one another, and connecting together the respective cylinder-end ports of the first and second hydraulic cylinders with one another in fluid communication, to thereby form a parallel fluid circuit between the first and second cylinders; connecting one of the first and second supply/return ports of the four-way valve in fluid communication with the rod-end ports of the first and second cylinders, and connecting the other of the first and second supply/return ports of the four-way valve in fluid communication with the cylinder-end ports of the first and second cylinders; connecting the first cylinder two-way valve and the first cylinder restrictor orifice in a series fluid circuit with one another and only the first cylinder; and connecting the second cylinder two-way valve and the second cylinder restrictor orifice being in a series fluid circuit with one another and only the second cylinder.

A method for remotely and individually positioning a plurality of remotely positionable stabilizer wheels, according to the invention, may also include operatively connecting an electronic control unit to the solenoids of the first cylinder two-way solenoid operated valve, the second cylinder two-way operated valve, and the solenoid of the four-way valve, for individually controlling extension and retraction of the first and second hydraulic cylinders through selective actuation of the solenoids of the first and second two-way valves and the solenoid of the four-way valve.

In one form of a method for remotely and individually positioning a plurality of remotely positionable stabilizer wheels, according to the invention, the method may include operatively connecting a first stabilizer wheel position sensor to provide an electrical signal indicative of a first stabilizer wheel present position to the electronic control unit, and operatively connecting a second stabilizer wheel position sensor to provide an electrical signal indicative of a second stabilizer wheel present position to the electronic control unit, and configuring the electronic control unit for receiving a desired stabilizer wheel position input signal, and individually controlling extension and retraction of the first and second cylinders to provide a present stabilizer wheel position for the each of the first and second stabilizer wheels that matches the desired stabilizer wheel position input.

The electronic control unit of a method for remotely and individually positioning a plurality of remotely positionable stabilizer wheels may be configured to receive first and second desired stabilizer wheel position input signals corresponding to the first and second stabilizer wheels respectively, and individually controlling extension and retraction of the first and second cylinders with the electronic control unit to provide a present stabilizer wheel position for the each of the first and second stabilizer wheels that matches the first and second desired stabilizer wheel position inputs respectively.

A method for remotely and individually positioning a plurality of remotely positionable stabilizer wheels, according to the invention, may include operatively connecting a first stabilizer wheel position sensor to provide an electrical signal indicative of a first stabilizer wheel present position to the electronic control unit, and operatively connecting a second stabilizer wheel position sensor to provide an electrical signal indicative of a second stabilizer wheel present position to the electronic control unit, and configuring the electronic control unit for receiving a desired depth input signal, and for individually controlling extension and retraction of the first and second cylinders to provide a present stabilizer wheel position for the each of the first and second stabilizer wheels that corresponds to the desired depth input signal.

The method, according to the invention, for remotely and individually positioning a plurality of remotely positionable stabilizer wheels, may also include configuring the electronic control unit to receive first and second desired stabilizer wheel position input signals corresponding to the first and second stabilizer wheels respectively, and for individually controlling extension and retraction of the first and second cylinders to provide a present stabilizer wheel position for the each of the first and second stabilizer wheels that matches the first and second desired stabilizer wheel position inputs respectively.

In some forms of the invention, the electronic control unit may be remotely mounted within the towing vehicle, and may utilize an ISOBUS, a touch screen in the towing vehicle cab, or such other standard communication and control devices and protocols as are available in the agricultural arts.

Other aspects, objects and advantages of the invention will be apparent from the following detailed description and accompanying drawings.

BRIEF DESCRIPTION OF THE DRAWINGS

The accompanying drawings and specification illustrate and explain several aspects of the present invention. Some of the reference numerals in the drawings utilize a numbering convention in which the letters "L" or "R" are appended to the reference numeral for components located on the left or right side, respectively, of the exemplary embodiments, with left and right being determined from the point of view of an observer standing at the rear of a towable implement looking forward toward a hitch at the front of the towable implement. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENTS

Figure 1:
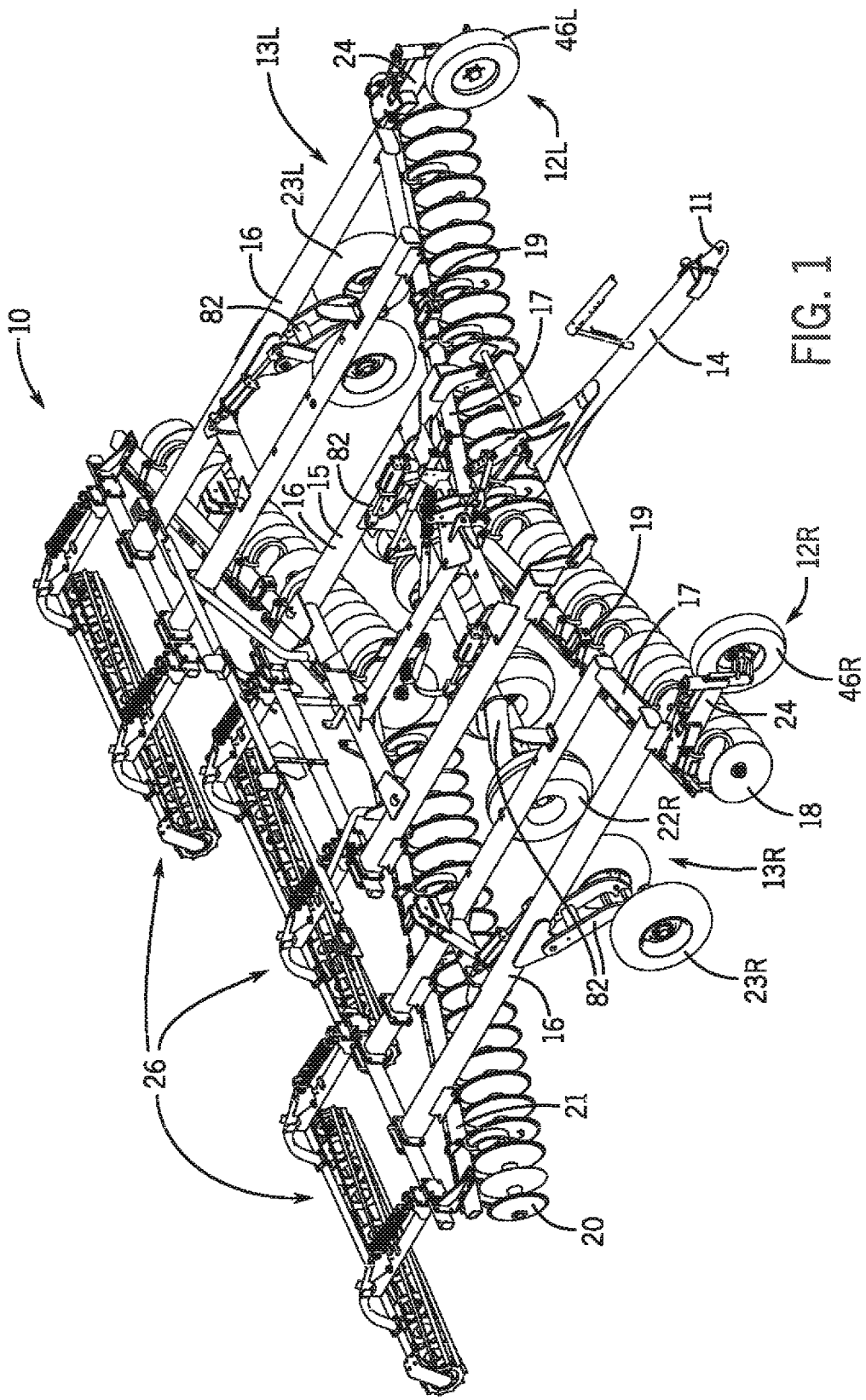
FIG. 1 is an isometric view of a towable agricultural tillage implement, according to the invention.

FIG. 1 shows an exemplary embodiment of a towable agricultural implement, according to the invention, in the form of a tandem disk 10, including a pair of left and right remotely adjustable stabilizer wheel arrangements 12L,12R. The disk 10 includes a hitch 14 at a front end of the implement, which has a distal end 11 that is adapted for operative attachment to a towing vehicle, such as a tractor. The disk 10 has a frame 16 that includes a pair of left and right floating wings 13L,13R connected to a central main section 15 of the frame 16 by a plurality of hinged joints 19. The disk 10 also includes segmented front and rear tillage tools, in the form of front and rear disk gangs 18, 20, that are operatively joined to the frame 16 by front and rear segmented tool bars 17,21 respectively. The tool bars 17,21 and disk gangs 18,20 are segmented and attached to the main frame 16 and wing frames 13L,13R in a manner that allows the wing frames 13L,13R and the segments of the front and rear disk gangs 18,20 to be folded above the center section 15 of the frame 16, to thereby narrow the disk 10 for transport on public roadways.

Figure 2:
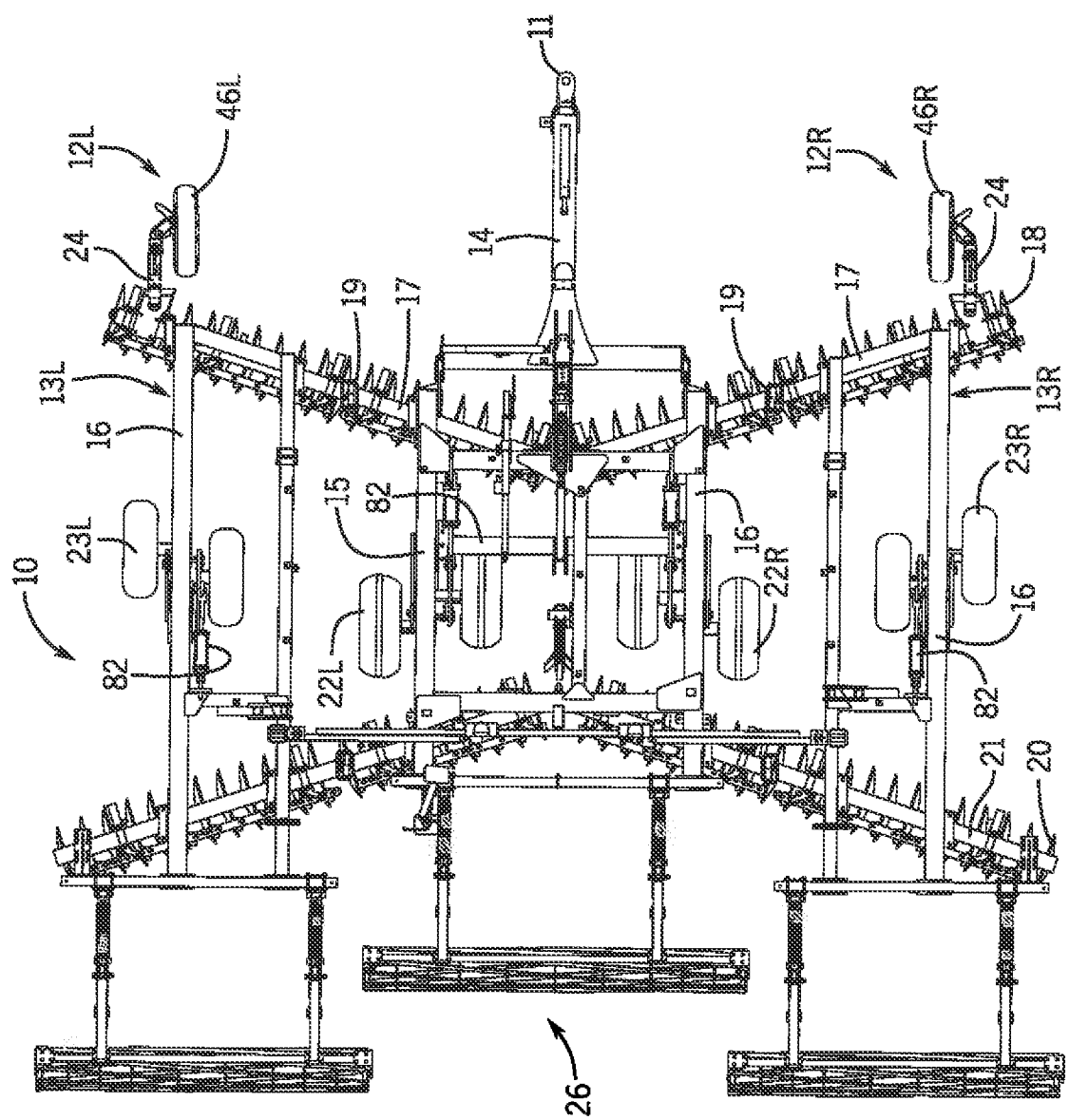
FIG. 2 is an orthographic top view of the exemplary embodiment of the implement of FIG. 1.
Figure 3:
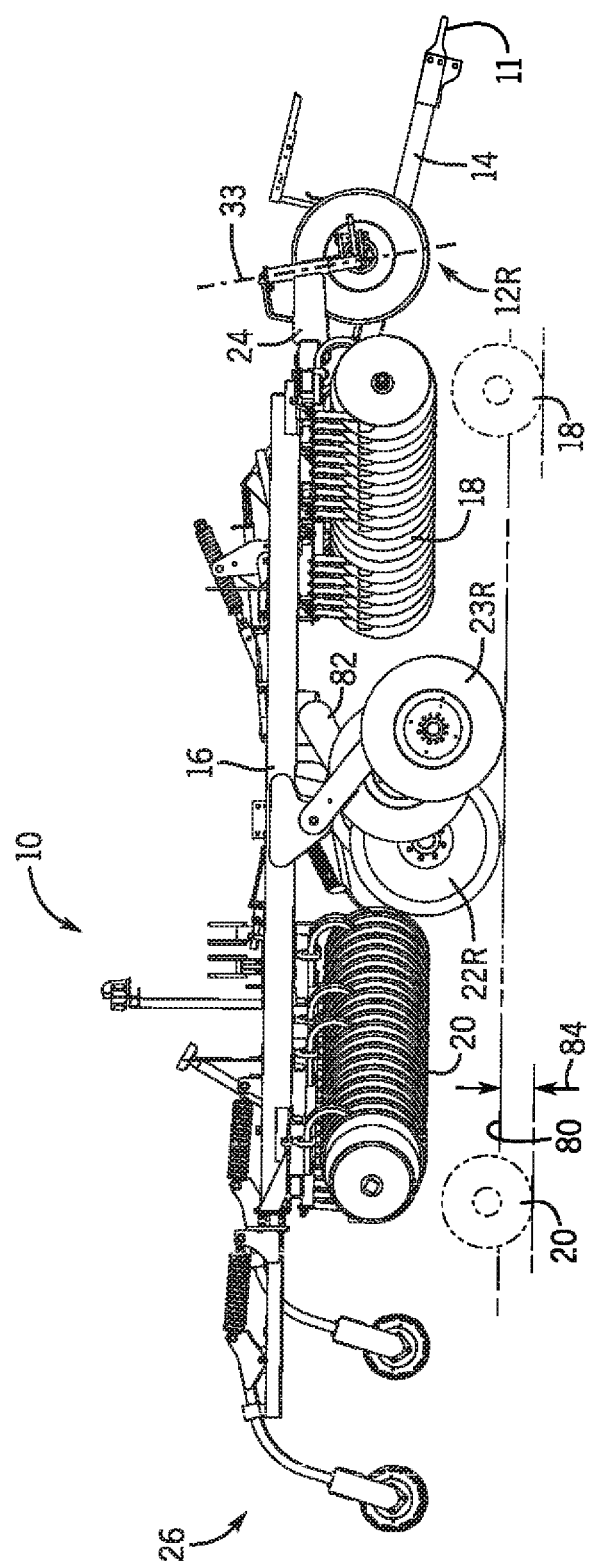
FIG. 3 is an orthographic side view of the exemplary embodiment of the implement of FIG. 1, showing the implement in a raised position for field transport, with stabilizer wheels and tillage tools of the implement raised off of the ground.

As shown in FIGS. 1-3, the disk 10 is supported above a ground surface 80 by two pairs of tandem support wheels 22L,22R, and right and left pairs of wing frame support wheels 23L,23R. The pairs of support and wing frame wheels 22L,22R,23L,23R are all operatively attached to the main frame 15 by a common depth control arrangement 82, in a manner that allows the depth control arrangement 82 to set and maintain a depth of penetration 84 of the tillage tools 18,20 below the ground surface 80, in the manner known in the art, and as indicated schematically in FIG. 3.

Specifically, the depth control arrangement 82 is configured such that, when the wing frames 13L,13R are lowered, as shown in FIGS. 1-3, the support wheels 22L,22R and wing frame wheels 23L,23R all act together to support the disk 10 above the ground surface 80. In FIG. 3, the disk 10 is shown in a raised, field transport condition, where the wheels 22L,22R,23L,23R and depth control arrangement 82 have lifted the disk gangs 18,20 out of contact with the ground surface 80. When the wing frames 13L,13R are lowered to a working configuration, as shown in FIGS. 1-3, and the depth control arrangement 82 is commanded to lower the disk 10 to a working position, the front and rear gangs 18,20 of tillage tools will penetrate the ground surface 80 to the depth of penetration 84, as indicated by dashed lines in FIG. 3.

The disk 10 and depth control arrangement 82 are further configured such that, when the wing frames 13L,13R are raised above the main frame 15 to narrow the disk 10 for towing on a public roadway, a part of the depth control arrangement 82 attaching the transport wheels 22L,22R to the main frame 15 is utilized to raise the disk 10 to a transport position, which is not illustrated in the drawings, in a manner known in the art.

As shown in FIGS. 1-3, the exemplary embodiment of the disk 10 also includes surface finishing tools, in the form of rotating crumblers 26 operatively attached to the rear of the disk 10.

As best seen in FIGS. 1 and 2, the disk 10 includes two remotely adjustable left and right stabilizer wheel arrangements 12L,12R which are respectively located near the left and right front extremities of front of the frame 16 and tool bar 17. In various embodiments of the invention, the stabilizer wheel arrangements 12L,12R may be operatively attached directly to the main frame 15 or wing frames 13L,13R of the frame 16, or alternatively attached to the front tool bar 17.

As discussed above, the main frame 15 and wing frames 13L,13R are joined together by a plurality of hinged connections 19, that allow the wing frames 13L,13R to be folded above the main frame 15. The disk 10 is further configured to utilize these hinged connections 19 in a manner that allows the wing frames 13L,13R to flex with respect to the main frame 15, so that the disk gangs 18,20 can better follow the terrain and conform to the ground surface 80, as the disk 10 is towed across the ground surface 80 during tillage operations. This flexibility of the disk frame 16, together with the extensive width of modern tillage implements (22 to 47 feet of width being commonplace) can cause the wings 13L,13R to bounce, under certain tillage conditions, and also contribute to the outer corners of the front disk gangs 18,20 undesirably digging too deeply into the ground surface 80, during turning or maneuvering the disk 10 around an obstacle. Accordingly, the remotely positionable stabilizer wheel arrangements 12L,12R of the exemplary embodiment of the disk 10 are advantageously attached to the wing frames 13L,13R, or the front tool bar 17 near the front left and right front corners of the disk 10. Positioning the remotely positionable stabilizer wheel arrangements 12L,12R in this manner maximizes their effectiveness in damping out wing bounce and/or undesirable digging-in of the front disk gang 18.

The stabilized wheel arrangements 12L,12R are properly adjusted to maintain only light contact pressure with the ground surface 80, until they come into operation due to a change in the terrain, so as to not interfere with operation of the depth control arrangement 82 and support and transport wheels 23L,23R,22L,22R in maintaining a desired depth of penetration 84 of the front and rear disk gangs 18,20 below the ground surface 80.

Figure 4:
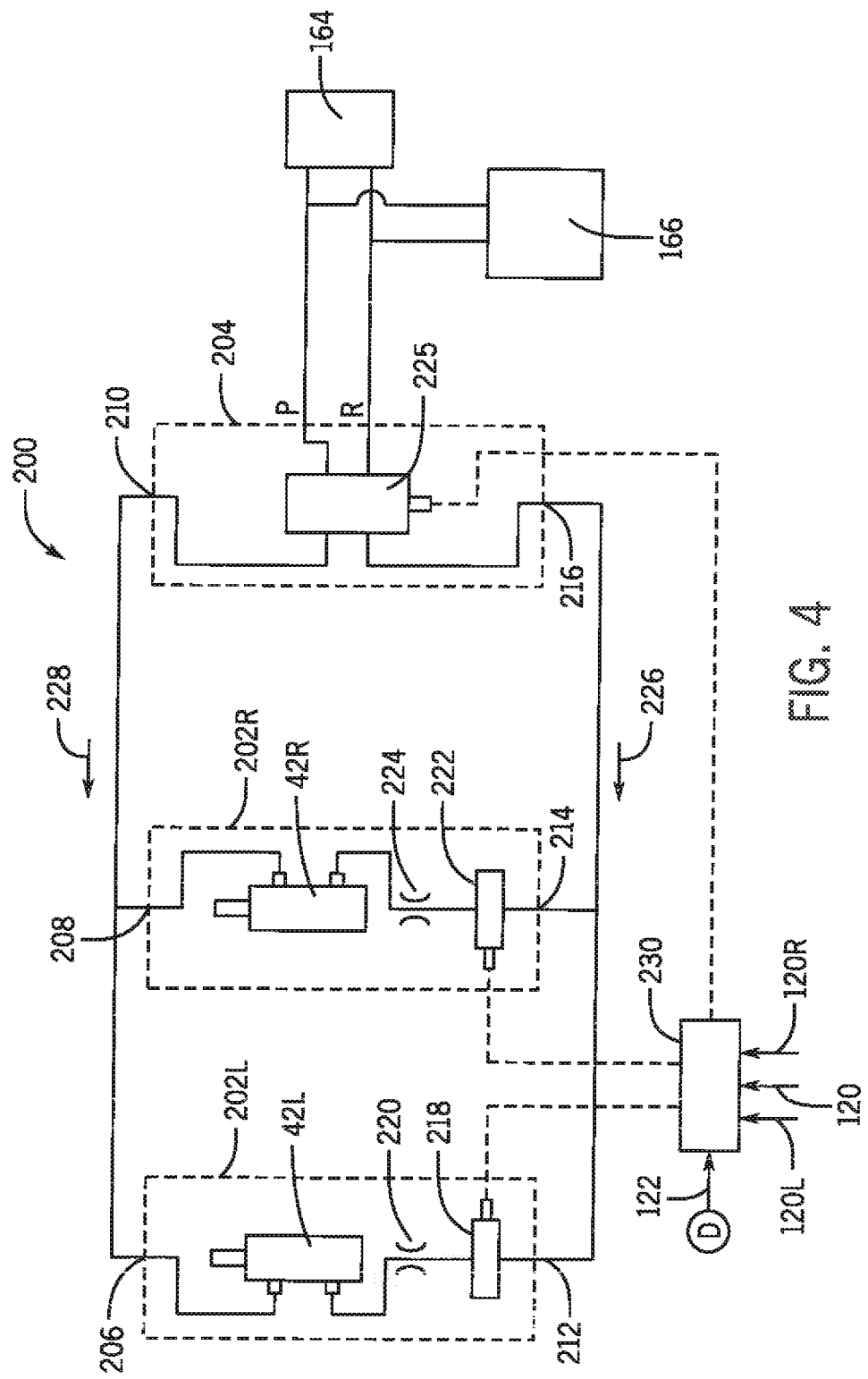
FIG. 4 is a schematic illustration of a first exemplary embodiments of a system, according to the invention, for individually positioning a plurality of remotely positionable stabilizer wheels.
Figure 5:
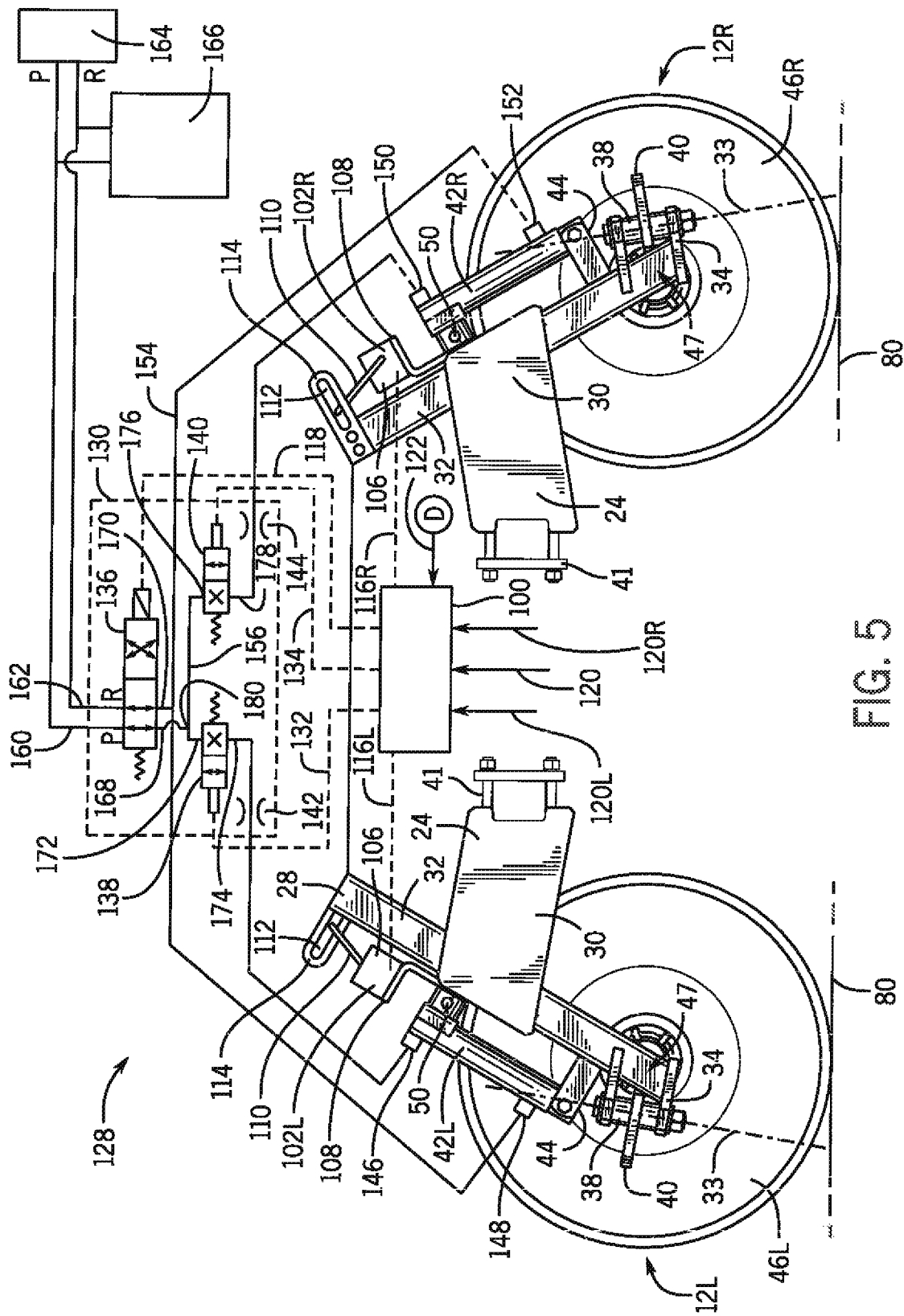
FIG. 5 is a partly schematic, orthographic, side view of exemplary embodiments of left and right remotely positionable stabilizer wheel arrangements of FIG. 1, and a second exemplary embodiments of a system for individually positioning a plurality of remotely positionable stabilizer wheels, with the left and right stabilizer wheels of the implement of FIG. 1 turned 90 degrees to the left and right, respectively, from their normal orientation as shown in FIGS. 1-3.

FIGS. 4 and 5 illustrate two alternate embodiments of systems 200,128 for remotely and individually positioning the left and right remotely positionable stabilizer wheels 46L,46R.

FIG. 4 is a schematic illustration of one embodiment of a system 200 for remotely and individually positioning the left and right remotely positionable stabilizer wheels 46L,46R of an agricultural tillage implement, such as the exemplary embodiment of the disk 10. The embodiment of the system 200 shown in FIG. 4 includes a left stabilizer wheel control arrangement 202L, a right stabilizer wheel control arrangement 202R, and an all-wheel control arrangement 204.

Each of the left and right stabilizer wheel control arrangements 202L,202R and the all-wheel control arrangement 204, include respective rod-end 206,208,210 and cylinder-end connections 212,214,216. Theses rod-end 206,208,210 and cylinder-end connections 212,214,216, respectively, are all joined together in fluid communication with one another, in a parallel circuit arrangement, with their respective rod-end connections 206,208,210 in fluid communication with one another and their respective cylinder-end connections 212,214,216 in fluid communication with one another.

The left stabilizer wheel control arrangement 210L includes a left double-acting hydraulic cylinder 42L that is operatively connectable to the left remotely positionable stabilizer wheel 12L, for respectively positioning the left stabilizer wheel 12L, through extension and retraction of the left hydraulic cylinder 42L. As indicated in FIG. 4, the left double-acting hydraulic cylinder 12L has a cylinder-end hydraulic port and a rod-end hydraulic port that are disposed on opposite sides of a piston of the left hydraulic cylinder 42L, and connected respectively in series with the cylinder-end and rod-end connections 212,206 of the left stabilizer wheel control arrangement 202L.

As shown in FIG. 4, the left stabilizer wheel control arrangement 202L further includes a solenoid-operated left cylinder shut-off valve arrangement 218 and a left cylinder flow restrictor arrangement 220, that are disposed in a series relationship with one another, the left cylinder 42L, and one of the cylinder-end 206 and rod-end 212 connections of the left stabilizer wheel control arrangement 202L. In the exemplary embodiment shown in FIG. 4, the left cylinder shut-off valve arrangement 218 and the left cylinder flow restrictor arrangement 220 are shown as single components, plumbed directly in series with one another and the cylinder-end connections 212 of the left stabilizer wheel control arrangement 202L and the left cylinder 42L. Those having skill in the art will recognize, however, that in other embodiments of the invention other plumbing arrangements within the left stabilizer wheel control arrangement 202L, and utilization of multiple components to perform the functions of the left-cylinder shut-off arrangement 218 and the flow restrictor arrangement 220 are contemplated within the scope of the invention.

In similar fashion, the right stabilizer wheel control arrangement 210R includes a right double-acting hydraulic cylinder 42R that is operatively connectable to the right remotely positionable stabilizer wheel 12R, for respectively positioning the right stabilizer wheel 12R, through extension and retraction of the right hydraulic cylinder 42R. As indicated in FIG. 4, the right double-acting hydraulic cylinder 12R has a cylinder-end hydraulic port and a rod-end hydraulic port that are disposed on opposite sides of a piston of the left hydraulic cylinder 42R, and connected respectively in series with the cylinder-end and rod-end connections 214,208 of the right stabilizer wheel control arrangement 202R.

As shown in FIG. 4, the right stabilizer wheel control arrangement 202R further includes a solenoid-operated right cylinder shut-off valve arrangement 222 and a left cylinder flow restrictor arrangement 224, that are disposed in a series relationship with one another, the right cylinder 42R, and one of the cylinder-end 214 and rod-end 208 connections of the right stabilizer wheel control arrangement 202R. In the exemplary embodiment shown in FIG. 4, the left cylinder shut-off valve arrangement 222 and the left cylinder flow restrictor arrangement 224 are shown as single components, plumbed directly in series with one another and the cylinder-end connections of the left stabilizer wheel control arrangement 202R and the left cylinder 42R. Those having skill in the art will recognize, however, that in other embodiments of the invention other plumbing arrangements within the right stabilizer wheel control arrangement 202R, and utilization of multiple components to perform the functions of the right-cylinder shut-off arrangement 222 and the right cylinder flow restrictor arrangement 224 are contemplated within the scope of the invention.

As further shown in FIG. 4, the all-wheel control arrangement 204 includes a solenoid operated control arrangement 225 that is configured for selectively supplying a pressurized flow of hydraulic fluid to the left and right cylinders 42L,42R in a first direction, as indicated by arrow 226, to thereby cause extension of the cylinders 42L,42R, and is further configured for supplying a pressurized flow of hydraulic fluid to the left and right cylinders in an opposite direction, as shown by arrow 228, to thereby cause retraction of the cylinders 42L,42R.

Those having skill in the art will recognize, however, that in other embodiments of an all-wheel control arrangement, according to the invention other plumbing arrangements within the all-wheel control arrangement 204, and utilization of multiple components to perform the functions of the all-wheel control valve arrangement 225 are contemplated within the scope of the invention.

The left and right cylinder shut-off arrangements 218,222 are selectively and individually operable independent of the control valve arrangement 225 of the all-wheel control arrangement 204, to thereby stop the flow of hydraulic fluid through the left and right cylinders 42L,42R respectively, for controlling the position of the left and right stabilizer wheels 46L,46R respectively.

The exemplary embodiment of the system 200 for remotely and individually positioning a plurality of remotely positionable stabilizer wheels 42,42R, shown in FIG. 4, further includes an electronic control unit 230 that is operatively connected to the solenoids of the left and right cylinder shut-off valve arrangements 218,222, and the solenoid of the control valve arrangement 225 of the all-wheel flow control arrangement 204, for individually controlling extension and retraction of the left and right hydraulic cylinders 42L,42R through selective actuation of the solenoids of the left and right shut-off valve arrangements 218,222 and the solenoid of the control valve arrangement 225 of the all-wheel control arrangement 204.

As further illustrated schematically in FIG. 4, the electronic control unit 230 is configured to also receive a desired stabilizer wheel position input 120 from an external source, such as an operator of the towing vehicle, indicating a desired common position for both the left and right stabilizer wheels 46L,46R. In some embodiments of the invention, the electronic control unit 230 may be further configured to receive additional external inputs 120L,12R for controlling position of the left and right stabilizer wheels 46L,46R independently from one another.

In some embodiments of the invention, such as the embodiment described below in relation to FIG. 5, some components of the left and right cylinder shut-off arrangements 202L,202R, and some components of the all-wheel control arrangement 204, may be packaged together in a common hydraulic power source 118. The invention may also take the form of an agricultural tillage implement incorporating a system 200 as described above, or a method for operating a system 200 as described above.

FIG. 5 shows a second exemplary embodiment of a system 128 for remotely and individually positioning left and right remotely positionable stabilizer wheels 46L,46R. The second system 128 for remotely and individually positioning left and right remotely positionable stabilizer wheels 46L,46R includes the left and right double-acting cylinders 42L,42R, and a common hydraulic power source 130 including a four-way solenoid-operated extend/retract valve 136, that performs the functions of the all-wheel flow control arrangement 204 of the embodiment of the system 200 shown in FIG. 4. The common hydraulic power source 130, of the embodiment of FIG. 5, also includes a left cylinder two-way solenoid-operated shut-off valve 138, a right cylinder two-way solenoid-operated shut off valve 140, a left cylinder restrictor orifice 142, and a right cylinder restrictor orifice 144 that perform the same functions respectively as the left and right shut-off arrangements 218,222, and the left and right flow-restrictor arrangements 220,224 of the embodiment of the system 200, of FIG. 4, for remotely and individually positioning the left and right remotely positionable stabilizer wheels 46L,46R.

FIGS. 5-11 illustrate additional exemplary embodiments of the remotely hydraulically positionable stabilizer wheel arrangements 12L,12R, of the exemplary embodiment of the disk 10. The left and right remotely positionable stabilizer wheel arrangements 12L,12R of the exemplary embodiments described herein are left and right hand assemblies of mostly identical groupings of component parts, which will be described in more detail below. Accordingly, the various identical components and features of the left and right remotely positionable stabilizer wheel arrangements 12L, 12R will generally be identified by identical reference numerals, except where the addition of the letters "L" or "R" will help to explain features of the exemplary embodiments.

FIG. 5 is a semi-schematic illustration of the exemplary embodiment of the system 128 for remotely and individually controlling a plurality of remotely adjustable stabilizer wheels, with the system 128 incorporated into the left and right remotely positionable stabilizer wheel arrangements 12L,12R of the exemplary embodiment of the disk 10. The exemplary embodiment of the system 128 for remotely and individually controlling a plurality of remotely adjustable stabilizer wheels, as incorporated into the left and right remotely positionable stabilizer wheel arrangements 12L, 12R of the exemplary embodiment of the disk 10, includes the left and right hydraulic cylinders 42L,42R, left and right stabilizer wheel position sensors 102L,102R, a common hydraulic power source 130, and a common electronic control unit 100.

The left remotely positionable stabilizer wheel arrangement 12L includes a support strut 28, a support strut bracket 24, a first (left) stabilizer wheel 46L, the first (left) hydraulic cylinder 42L, the common hydraulic power source 130, the first (left) stabilizer wheel position sensor 102L, and the common electronic control unit 100.

In similar fashion, the right remotely positionable stabilizer wheel arrangement 12R includes a support strut 28, a support strut bracket 24, a second (right) stabilizer wheel 46R, the second (right) hydraulic cylinder 42R, the common hydraulic power source 130, the second (right) stabilizer wheel position sensor 102R, and the common electronic control unit 100.

In both the left and right remotely positionable stabilizer wheel arrangements 12L,12R, the support strut 28 has a first, lower, end 34 thereof adapted for mounting one of the stabilizer wheels 46L,46R to the support strut 28, using an invertable hub and pivot apparatus 38, in a manner that allows the each of the left and right stabilizer wheels 46L,46R to roll about its respective substantially horizontal rotational axes 47 when the stabilizer wheel (46L or 46R) is in contact with the ground surface 80. As will be described in more detail below, the lower end of each of the support struts 28 is also configured to form a pivot bracket 34, and is connected to its respective stabilizer wheel 46L,46R by an invertable hub and pivot apparatus 38, that allows the wheels 46L,46R to simultaneously roll about their respective rotational axis 47 and pivot, to a limited degree, about a respective pivot axis 33 that extends in a generally up and down, non-horizontal direction, to thereby facilitate maneuverability of the disk 10.

Each of the support strut brackets 24 has a first end 41 thereof adapted for attachment to the implement frame 16, or the front tool bar 17. In the embodiments shown in FIGS. 5-6 and 9-10, the first end 41 of the support strut bracket is configured as a bolt-on clamping arrangement. In other embodiments, the first end 41 of the support strut bracket may be configured for attachment by any appropriate method, such as a through a bolting flange or by welding. The second, distal, end 30 of each of the support strut brackets 24 is configured for slidable engagement with a second end 32 of one of the support struts 28, in a manner allowing the stabilizer wheels 46L,46R to alternatively be lowered into contact the ground surface 80, or raised out of contact with the ground surface 80.

A first, lower, rod end of each of the left and right hydraulic cylinders 42L,42R is operatively attached to a pair of ears 44 of the pivot bracket 34 at the lower end of the respective left or right support strut 28 by a pivoting pin or bolted connection. The other, upper, cylinder end of each of the left and right hydraulic cylinders 42L,42R is operatively attached through a pivotable pinned or bolted connection to a second pair of ears 50 fixedly attached to the second end 30 of the respective left or right support strut bracket 24. By virtue of this arrangement, the left and/or right support strut 28 can be extended or retracted with respect to its respective strut bracket 24 by corresponding extension and retraction of the left and/or right hydraulic cylinder 42L,42R, to thereby respectively lower and raise the left and/or right stabilizer wheel 46L,46R in to, and out of contact with the ground surface 80.

Figure 6:
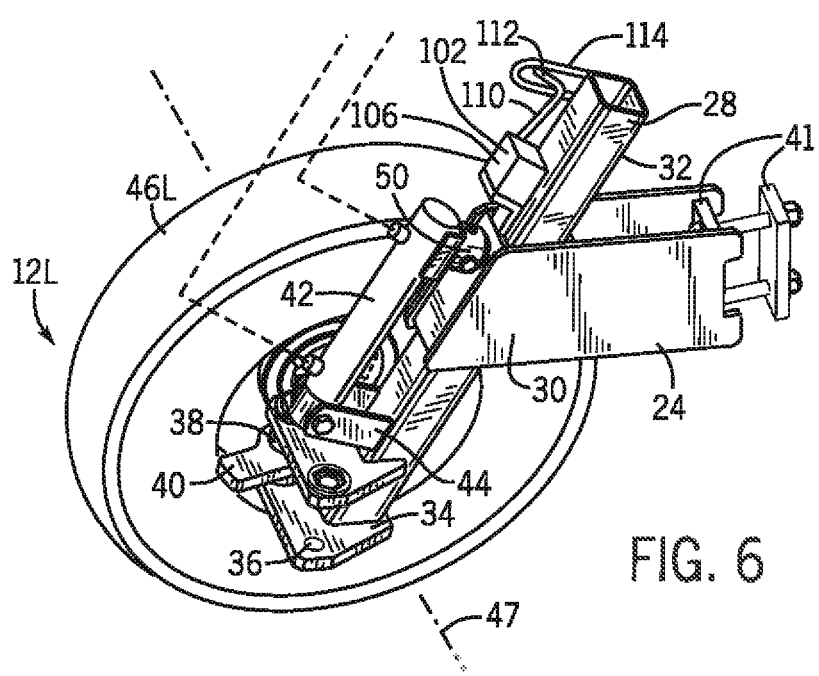
FIG. 6 is an isometric view of a portion of the exemplary embodiment of a left remotely positionable stabilizer wheel arrangement of FIG. 5, as viewed from the left front corner of exemplary embodiment of the implement of FIG. 1.

As shown in FIGS. 5 and 6, the left and right stabilizer wheel position sensors 102L,102R, of the remotely positionable stabilizer wheel arrangements 12L,12R are both operatively connected between their respective strut 28 and strut bracket 24, for indicating a present linear position of their respective strut 28 with respect to their respective strut bracket 24, and for generating electrical signals 116L,116R that are indicative of the present positions of the left and right stabilizer wheels 46L,46R with respect to their respective strut bracket 24. In the embodiment shown in FIGS. 4 and 5, each of the left and right position sensors 102L,102R is a rotary potentiometer, having a body 106 attached to a sensor mounting bracket 108 that extends upward from and is fixedly attached to the second end 30 of the support strut bracket 24. The rotary potentiometers 102L,102R each have a rotatable arm 110 thereof, that slidingly engages an elongated slot 112 in a guide bracket 114 that is affixed to the upper end 32 of the strut 28, in such a manner that linear movement of the strut 28 with respect to the strut bracket 24 is translated into rotation of the arm 110 of the potentiometers 102L,102R with respect to the body of potentiometer 102, to thereby cause the potentiometers 102L,120R to generate the electrical signals 116L,116R indicating a present positions of the left and right stabilizer wheel 46L,46R with respect to their respective strut bracket 24.

It will be appreciated that once the present positions of the stabilizer wheels 46L,46R with respect to the strut brackets 24 are known, it is a matter of straightforward geometrical calculation, using the dimensions of the disk 10, and the current depth of penetration being held by the depth control arrangement 82, to also determine contact, or lack of contact of the stabilizer wheel 46 with the ground surface 80. It will also be appreciated that, in other embodiments of the invention, the position sensors 102L,102R may take a variety of different forms, and utilize sensing elements other than a rotary potentiometer. For example, it is contemplated that other embodiments of the invention may utilize some form of a linear position sensor operatively connected between the strut 28 and the strut bracket 24, or a Hall-effect or other type of cylinder rod extension sensor built into the hydraulic cylinders 42L,42R.

As illustrated schematically in FIG. 5, the hydraulic power source 130 is operatively connected to the hydraulic cylinders 42L,42R for controlling extension and retraction of the cylinders 42L,42R in response to a cylinder control electrical signals 118,132,134 received from the electronic control unit 100, in the manner described in more detail below. It is contemplated that the hydraulic power source 130 may take the form of any suitable electrically controlled source of hydraulic power, available as a part of the disk 10 or in the towing vehicle.

As further illustrated schematically in FIG. 5, the electronic control unit 100, of the remotely positionable stabilizer wheel arrangements 12L,12R and the system 128 for remotely and individually controlling a plurality of remotely positionable stabilizer wheels, is further operatively connected to the left position sensor 102L to receive the present stabilizer wheel position signal 116L from the left position sensor 102L, and is also operatively connected to the right position sensor 102R to receive the present stabilizer wheel position signal 116R from the right position sensor 102R. As further illustrated schematically in FIG. 5, the electronic control unit 100 is configured to also receive a desired stabilizer wheel position input 120 from an external source, such as an operator of the towing vehicle.

The electronic control unit 100 is internally configured for providing the cylinder control electrical signals 118,132,134 to the common hydraulic power source 130, to thereby cause the left and right hydraulic cylinders 42L,42R to move the left and right stabilizer wheels 46L,46R to, and hold the left and right stabilizer wheels 46L,46R at present left and right stabilizer wheel positions, as indicated by the position signals 116L,116R generated by the left and right position sensors 102L,102R, that are equal to the desired stabilizer wheel position input 120 received from the external source. By virtue of this arrangement, the positions of the left and right stabilizer wheels 46L,46R are individually controlled by the common electrical control unit 100 and the common hydraulic power source, in a manner described in more detail, collectively to move to the same distance from their respective strut bracket 24. As further indicated in FIG. 4, in alternate embodiments of the invention, the electronic control unit 100 may be configured to receive individual left and right desired stabilizer wheel inputs 120L,120R, and the common electrical control unit 100 may control the common hydraulic power source 130, and control the position of the left and right stabilizer wheels 46L,46R completely individually from one another, with respect their respective strut bracket 24.

As shown in FIG. 5, the exemplary embodiment of the common hydraulic power source 130 includes a four-way, solenoid-operated, spring return, extend/retract valve 136, a first cylinder two-way, solenoid-operated, spring return, normally closed, shut-off valve 138, a second cylinder two-way, solenoid-operated, spring return, normally closed shut-off valve 140, a first cylinder restrictor orifice 142, and a second cylinder restrictor orifice 144.

The left (first) hydraulic cylinder 42L is a double-acting cylinder, and is operatively connected to the left (first) remotely positionable stabilizer wheel 46L, for respectively positioning the left stabilizer wheel 46L through extension and retraction of the left hydraulic cylinder 42L. The left hydraulic cylinder 42L has a cylinder-end hydraulic port 146 and a rod-end hydraulic port 148 disposed on opposite sides of a piston (not shown) of the left hydraulic cylinder 42L. The right (second) hydraulic cylinder 42R is also a double-acting hydraulic cylinder, and is operatively connected to the right (second) remotely positionable stabilizer wheel 46R, for respectively positioning the right stabilizer wheel 46R, through extension and retraction of the right hydraulic cylinder 42R. The right hydraulic cylinder 42R has a cylinder-end hydraulic port 150, and a rod-end hydraulic port 152 disposed on opposite sides of a piston (not shown) of the right hydraulic cylinder 42R. The first and second hydraulic cylinders 42L,42R also have their respective rod-end ports 148,152 connected together with one another in fluid communication, as indicated by fluid line 154, and their respective cylinder-end ports 146,150 connected together with one another in fluid communication, as indicated by fluid line 156, to thereby form a parallel fluid circuit between the first and second hydraulic cylinders 42L,42R.

The four-way valve 136 includes pressure and return ports 160,162 adapted respectively to receive pressurized hydraulic fluid from a source 164 of pressurized hydraulic fluid, and for returning pressurized hydraulic fluid to the source 164 of pressurized hydraulic fluid. In the exemplary embodiment 128 shown in FIGS. 4 and 5, the source 164 of hydraulic power is an electrically controlled hydraulic channel of the towing vehicle, which also supplies pressurized hydraulic fluid to a hydraulic control system 166 for the rotating crumblers 26 attached to the rear of the disk 10, as shown in FIGS. 1-3. It will be understood that, in other embodiments of the invention, the source of pressurized hydraulic fluid 164 may be supplied from another source external to, or part of the disk 10 and the hydraulic power source 130, or alternatively be incorporated into the hydraulic power source 130.

The four-way valve 136 also includes first and second supply/return ports 168,170 that are operatively and selectively connectable in fluid communication directly to the pressure and return ports 160,162 of the four-way valve 136 in a normally open straight-through, non-actuated, condition of the solenoid of the four-way valve 136, and alternatively, operatively and selectively cross-connectable in fluid communication to the return and pressure ports 162,160 of the four-way valve in an actuated cross-connected condition of the four-way valve 136.

The first supply/return port 168 of the four-way valve 136 is connected in fluid communication with the rod-end ports 148,152 of the left and right cylinders 42L,42R, and the second supply/return port 162 of the four-way valve 136 is connected in fluid communication with the cylinder-end ports 146,150 of the first and second cylinders 42L,42R. By virtue of these connections, the four-way valve 136 functions as a selective, and collective, raise-and-lower control valve for both of the left and right stabilizer wheels 46L, 46R.

The left (first) and right (second) two-way valves 138,140 are each solenoid actuated, normally-closed, spring-return valves, each including respective first and second ports 172,174; 176,178 of the two-way valves 138,140. The first and second two-way valves 138,140 are each internally configured such that, in a first, non-actuated, normally-closed position of the two-way valves 138,140, the first and second ports 172,174; 176,178 are blocked from having fluid communication with one another, thereby precluding fluid flow through the two-way valves 138,140. The first and second two-way valves 138, 140 are each further internally configured such that, in a second, actuated position of the two-way valves, the first and second fluid ports 172,174; 176,178 of the two-way valves 138,140 are connected in fluid communication with one another, to thereby allow fluid flow through the two-way valves 138,140 from first to the second ports 172,174; 176,178.

The left cylinder two-way valve 138 and the left cylinder restrictor orifice 142 are connected in a series fluid circuit with one another and only the left cylinder 42L, in the fluid line 156 that connects the cylinder end ports of the left and right cylinders 42L,42R, to thereby function as a left cylinder shut-off valve 138. And, the right cylinder two-way valve 140 and the right cylinder restrictor orifice 144 are connected in a series fluid circuit with one another and only the right cylinder 42R, in the fluid line 154 that connects the rod end ports of the left and right cylinders 42L,42R to thereby function as a right cylinder shut-off valve 140.

Stated another way, the left two-way valve 138 and restrictor orifice 142 are located in the fluid line 156 connecting the rod-end ports of the cylinders 42L,42R to the left of a point of connection 180 of the first supply/return port 168 with the fluid line 156 connecting the rod-end ports of the cylinders 42L,42R, and the right two-way valve 140 and restrictor orifice 144 are located in the fluid line 156 connecting the rod-end ports of the cylinders 42L,42R to the right of the point of connection 180 of the first supply/return port 168 with the fluid line 156 connecting the rod-end ports of the cylinders 42L,42R.

As further shown in FIG. 5, the electronic control unit 100 is operatively connected to provide a raise/lower command signal 118 to the solenoid of the four-way valve 136, a left cylinder shut-off signal 132 to the solenoid of the right two-way valve 138, and a left cylinder shut-off signal 134 to the solenoid of the right two-way valve.

To extend both the left and right cylinders 42L,42R for simultaneously lowering both the left and right stabilizer wheels 46L,46R toward the ground surface 80, the electronic control unit 100 leaves the four-way valve 136 in its normally open, non-actuated condition, and commands both the left and right two-way valves 138,140 to actuate and move to their respective open conditions, so that pressurized hydraulic fluid may flow into the cylinder ports 146,150 of both the left and right hydraulic cylinders 42L,42R, and to allow hydraulic fluid to freely return through the four-way valve 136 from the rod end ports of both the left and right hydraulic cylinders 42L,42R.

To retract both the left and right cylinders 42L,42R for simultaneously lowering both the left and right stabilizer wheels 46L,46R away from the ground surface 80, the electronic control unit 100 actuates the four-way valve 136 to its cross-flow condition, and commands both the left and right two-way valves 138,140 to actuate and move to their respective open conditions, so that return hydraulic fluid may flow out of the cylinder-end ports 146,150 of both the left and right hydraulic cylinders 42L,42R through the return port 162 of the four-way valve 136, and pressurized hydraulic fluid can flow from the four-way valve 136 into the rod-end ports of both the left and right hydraulic cylinders 42L,42R.

At any time, the electronic control unit 100 can allow either or both of the left and right two-way valves 138,140 to return to its normally-closed, non-actuated condition, to thereby hold either or both the left and/or right stabilizer wheels 42L,42R at its present position. Conversely, the electronic control unit can actuate either the left or right two-way valve 138,140 individually to allow flow through only the actuated left or right two-way valve, to raise or lower the respective left or right stabilizer wheel 46L,46R depending upon whether the four-way valve 136 is simultaneously being commanded to raise or lower the stabilizer wheel attached to the open one of the left and right two-way valves.

In some forms of the invention, the control unit 100 (or 230) selects a predetermined stabilizer wheel position, stored in memory of the control unit 100, corresponding to the desired stabilizer wheel position input 120 and controls the hydraulic power source 130 using the predetermined stabilizer wheel position. In other forms of the invention, the control unit 100 may calculate a computed desired stabilized wheel position corresponding to the desired stabilizer wheel position input 120, and controls the hydraulic power source 130 using the computed desired stabilizer wheel position. For example, where the control input 120 calls for desired extension of 24 inches of the stabilizer wheels 46L,46R with respect to the strut bracket 24, the electronic control unit 100 will either look up a desired extension position signal 116L,116R stored in memory, or calculate a desired present position signal 116L,116R, and then issue appropriate commands 118,132,134 to the hydraulic power supply 130 to cause the hydraulic cylinders 42L,42R to individually drive the stabilizer wheels 46L,46R to, and hold the stabilizer wheels 46L,46R at a position of 24 inches, whereat the present position signals 116L,116R match the desired position signal 120. If a new desired position input of 23 inches is provided, the above processes would be repeated to position the stabilizer wheels 46L,46R at the new position desired present position of 23 inches.

In some forms of the invention, the electronic control unit 100 (or 230) may be configured to position either or both of the stabilizer wheels 46L,46R in response to a desired stabilizer wheel position input signal 120,120L,120R calling for an incremental adjustment to a previous desired stabilizer wheel position. For example, where the left remotely positionable stabilizer wheel 46L is currently operating at extension distance of 24 inches from the strut bracket 24, a left input signal 120L may call for the extension distance to be increased by ½ inch from the present position, causing the electronic control unit 100 to calculate a new desired extension position of the stabilizer wheel at 24½ inches from the strut bracket 24, and control the hydraulic power unit 130 to drive the left stabilizer wheel 46L to, and hold the left stabilizer wheel 46L at an extension of 24½ inches.

As illustrated schematically in FIGS. 4 and 5, in some forms of a remotely positionable stabilizer wheel arrangement 12, according to the invention, the electronic control unit 100 (or 230) may be yet further configured for receiving a desired depth electrical signal 122 and computing a computed desired position of the stabilizer wheels 46L,46R, and for providing cylinder control signals 118,132,134 corresponding to the computed desired position of the stabilizer wheels 46L,46R to the hydraulic power unit 130, (or control arrangements 202L,202R, 204), to thereby cause the hydraulic cylinders 42L,42R to move the stabilizer wheels 46L,46R to, and hold the stabilizer wheels 46L,46R at the computed desired stabilizer wheel position corresponding to the desired depth electrical signal 122. The electronic control unit 100 may be configured for selecting a predetermined stabilizer wheel position corresponding to the desired depth electrical signal 122, and controlling the hydraulic power source 130 using the selected predetermined stabilizer wheel position. In some forms of the invention, the control unit 100 (or 230) may calculate a computed desired stabilizer wheel position corresponding to the desired depth input 122 and control the hydraulic power source 130 (or control arrangements 202L,202R, 204) using the computed desired stabilizer wheel position. The desired depth input 122 may indicate the desire to make an incremental adjustment to a previous desired depth of penetration 84, in some embodiments of the invention.

In embodiments of the invention utilizing a desired depth signal 122, it is contemplated that the desired depth signal may be an input from a source, such as an operator of the towing vehicle, or may alternatively, in some embodiments of the invention, be generated from sensors operating as part of a depth control arrangement 82, or otherwise incorporated into an embodiment of a towable tillage implement 10 according to the invention.

As indicated above, in the exemplary embodiment of the disk 10, the left and right remotely positionable stabilizer wheel arrangements 12L,12R, according to the invention, the first end 34 of the stabilizer wheel strut 28 is configured as a pivot bracket 34 for operatively connecting the stabilizer wheel 46 to the strut 28. The pivot bracket 34 defines a substantially horizontally extending rolling axis 47 of the stabilizer wheel 46, and also defines a non-horizontal pivot axis 33 of the stabilizer wheel 46, in such a manner that the stabilizer wheel 46 can simultaneously rotate about the rolling axis 47 and pivot about the pivot axis 33, to thereby facilitate maneuvering of the disk 10.

Figure 7:
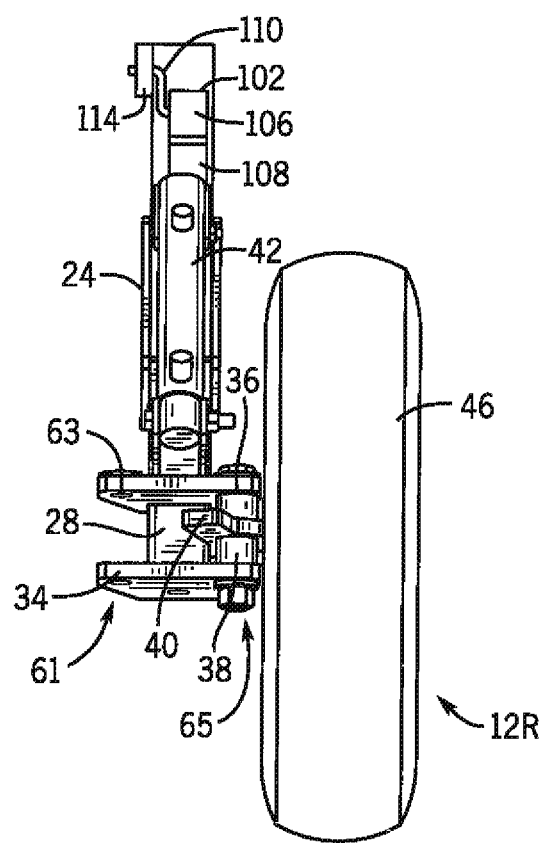
FIGS. 7 and 8 respectively, are enlarged front orthographic views of right and left remotely positionable stabilizer wheel arrangements of the implement of FIG. 1.

As shown in FIGS. 5-11, the pivot bracket 34 of the exemplary embodiments is part of a reversible and interchangeable pivot assembly 38 that allows components of the pivot assembly to be assembled in either a left-hand configuration, as shown in FIGS. 5-6, or in a right-hand configuration, as shown in FIG. 7.

As shown in FIGS. 7-11, the pivot bracket 34 includes holes 36 that allow the pivot assembly 38 to be placed on either side of the pivot bracket 34. The pivot assembly 38 also includes pivot stop 40 that is configured to contact the pivot bracket 34 at a predetermined pivot angel of the stabilizer wheel 49 about the pivot axis 33, to thereby limit the pivoting movement of the stabilizer wheel 46 about the pivot axis 33. The pivot stop 40 of the exemplary embodiment is configured as an outwardly extending tang, which contacts the lower end 34 of the strut 28 in a manner that sets essentially a one-way pivoting angular limit on the stabilizer wheel 46.

Figure 8:
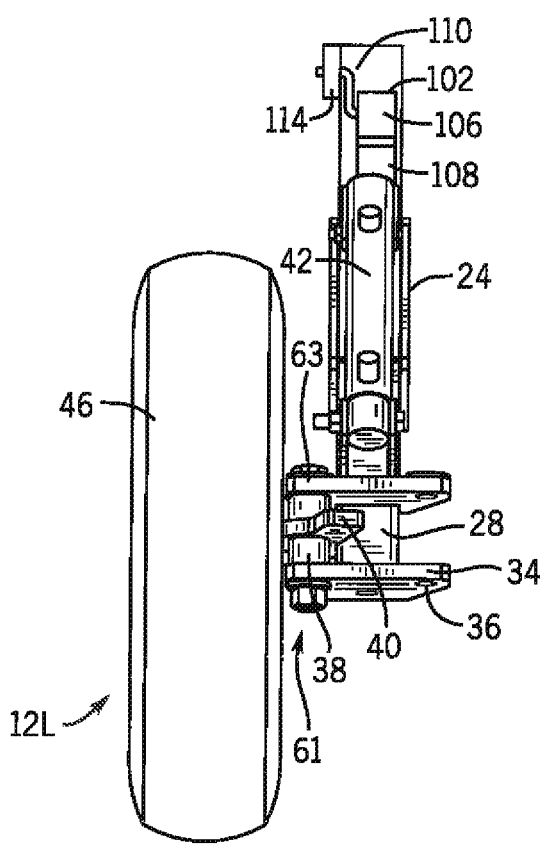
Figure 9:
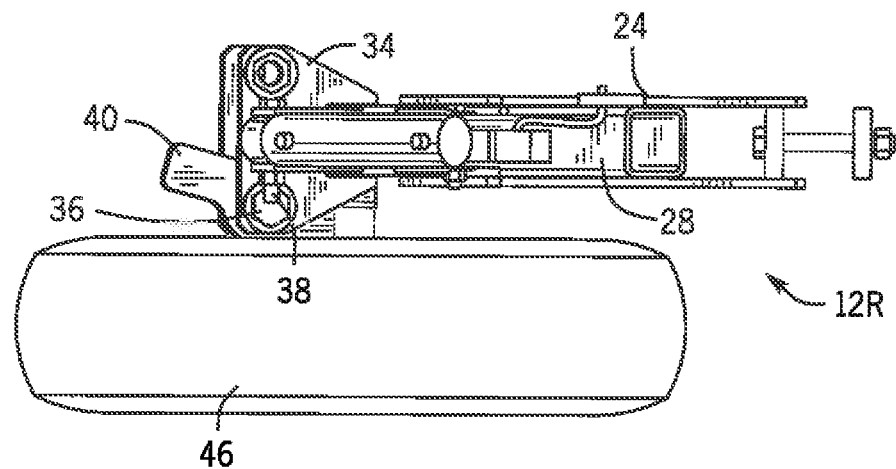
FIGS. 9 and 10 respectively, are enlarged top orthographic views of right and left remotely positionable stabilizer wheel arrangements of the implement of FIG. 1.
Figure 10:
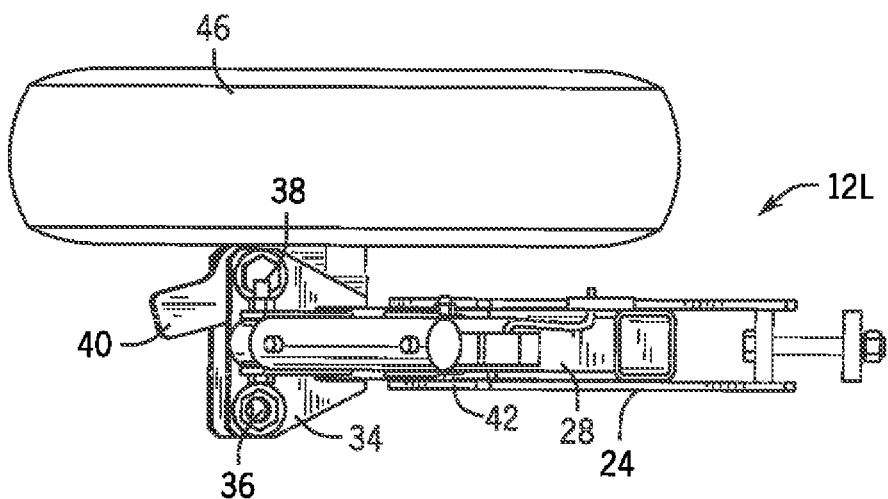

FIGS. 7 and 8 illustrate front views of the right and left remotely positionable stabilizer wheel arrangements 12L, 12R, respectively of the exemplary embodiment of the disk 10, with left and right being determined from the point of view of a person standing behind the disk 10 and looking toward the hitch 14. As will be appreciated by one skilled in the art, from examination for FIGS. 5-11, the same components are used for both the left and right stabilizer wheel arrangements 12L,12R of the exemplary embodiment of the disk 10. Configuring the stabilizer wheel arrangement for operation on one side or the other of the disk 10 is simply a matter of positioning the wheel 46, pivot assembly 38 and pivot stop 40 on the appropriate side of the bracket 34.

Figure 11:
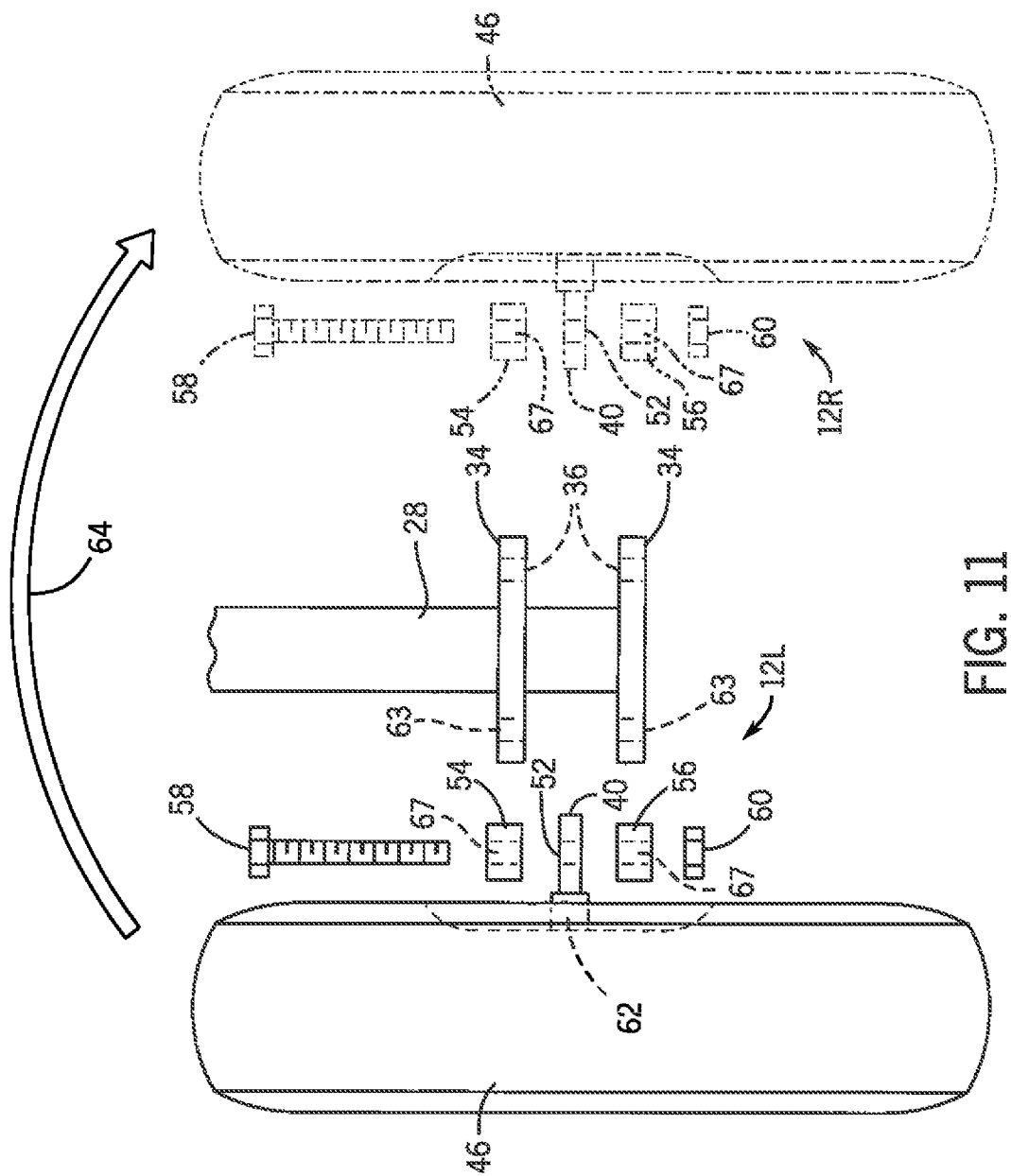
FIG. 11 is an illustration of the manner in which a remotely positionable stabilizer wheel arrangement, according to the invention, may be alternatively configured for use on either a left or a right side of the implement of FIG. 1.

FIG. 11 illustrates the orientation of the components of an embodiment of a stabilizer wheel arrangement 12 to properly configure the stabilizer wheel arrangement 12 for placement on one side or the other of an implement. The pivot stop 40 includes an upper surface 52, and a hole 36 that is aligned with holes 67 in spacers 54 and 56 for the placement of bolt 58. The assembled configuration may include bolt 58 inserted through pivot bracket holes 36, spacers 54 and 56, and pivot stop 40 with nut 60 securing the end of the bolt 58 against the bottom of pivot bracket 34. In the embodiment, the pivot stop 40 is a flat plate that may be described as a tang that protrudes from a wheel bearing assembly 62. Bearing assembly 62 is a mechanism that permits pivotal movement of the stabilizer wheel 12. Arrow 64 shows the alternative configuration for stabilizer wheel assembly 12, with bolt 58, spacers 54 and 56 and pivot stop 40 located on the opposite side of pivot bracket 34. It should be noted that the present configuration illustrates that pivot stop 40 is flipped 180 degrees for attachment to the other side of pivot bracket 34. That is, upper surface 52 is actually facing "downward" in the second configuration, as shown by the hidden lines. The configuration of pivot stop 40 is such that it may be used on either side of the pivot bracket 34 as long as the wheel 46 is rotated 180 degrees in a vertical plane, as generally indicated by arrow 64.

The invention may also take the form of a method for remotely positioning a stabilizer wheel arrangement 12 according to the invention, in an agricultural tillage implement 10 according to the invention. Such a method may include the steps of: operatively attaching a first end of a hydraulic cylinder 42 to the support strut 28, and a second end of the hydraulic cylinder 42 to the support strut bracket 24 for extension and retraction of the strut 28 with respect to the strut bracket 24 by corresponding extension and retraction of the hydraulic cylinder 42 to thereby lower and raise the stabilizer wheel 46 in to, and out of contact with the ground surface 80; operatively connecting a position sensor 102 between the strut 28 and the strut bracket 24 for indicating a present linear position of the strut 28 with respect to the strut bracket 24, and generating an electrical signal 116 indicative of a present stabilizer wheel position with respect to the strut bracket 24; operatively connecting a hydraulic power source 130 to the hydraulic cylinder 42 for controlling extension and retraction of the cylinder 42 in response to a cylinder control electrical signal 118; and operatively connecting an electronic control unit 100 to the position sensor 102 and the hydraulic power source 130 to receive the present position signal 116 and a desired stabilizer wheel position input 120, and to provide the cylinder control electrical signal 118 to the hydraulic power source 130, to thereby cause the hydraulic cylinder 42 to move the stabilizer wheel 46 to, and hold the stabilizer wheel 46 at the desired stabilizer wheel position 120.

As will be appreciated, in a method according to the invention, the electronic control unit 100, or 230, may be configured for monitoring and periodically automatically adjusting fluid flow to the stabilizer wheel hydraulic cylinders 42L,42R as the disk 10 is pulled through a field, to thereby ensure that the present position of the stabilizer wheels 46L,46R with respect to their respective strut bracket 24 remains within a predetermined, desired positional tolerance dead band, (e.g., 1 inch, 0.5 inches, 0.25 inches, 0.1 inches, etc.). For example, the electronic control unit 100, or 230, may compare the present stabilizer wheel position signals 120L,120R to the desired stabilizer wheel position input 120 at discrete elapsed time intervals (e.g., 0.1 Hz, 0.5 Hz, 1 Hz, 2 Hz, etc.). If the difference between the present stabilizer wheel position signals 120L,120R and the desired stabilizer wheel position input 120 is greater than the desired dead band, the electronic control unit 100, or 230, may be configured to cooperatively actuate valves 136, 138, 140 of the all-wheel control arrangement 204, and the left and right stabilizer wheel control arrangements 202L,202R in an appropriate manner extend or retract one or both of the left and right stabilizer wheel cylinders 42L, 42R, to reposition one or both of the stabilizer wheels 46L,46R, as required to bring the difference between the present stabilizer wheel position signals 120L,120R and the desired stabilizer wheel position input 120 back within the desired dead band.

In some embodiments of the invention, the electronic control unit 100, or 230, may be configured with a pre-set dead band. In other embodiments, the dead band may be manually adjustable, so that the operator of the disk 10 can indicate a desired dead band. In some embodiments of the invention, multiple dead bands may be utilized to optimize controllability and responsiveness of a system, implement or method, according to the invention. For example, a first dead band may be employed to determine whether one or both of the stabilizer wheels 46L,46R is/are positioned farther from the strut bracket 24 than is desired, and a second dead band may be employed to determine whether one or both of the stabilizer wheels 46L,46R is/are positioned closer to the strut bracket 24 than is desired.

From the foregoing, it will be appreciated that the invention provides a number of significant improvement over prior manual approaches to positioning single and multiple implement stabilizer wheels. The invention provides approaches to positioning stabilizer wheels that are far less cumbersome and time-consuming than prior approaches, eliminate the need for an operator's assistant on the ground, and substantially reduce the risk of adjustment error. Complex and cumbersome manual turnbuckles are replaced with more reliable hydraulic and electrical components and connections.

The invention allows positioning of stabilizer wheels to be carried out remotely by an operator seated in the towing vehicle, without the need for the operator to dismount from the towing vehicle, and without having an assistant on the ground. The invention also allows the stabilizer wheels to be automatically, rather than manually, positioned in response to a simple command from an operator in the cab of the towing vehicle. Through practice of the invention, the stabilizer wheels can be automatically adjusted in response to changes in depth of tillage. The invention provides capability for accomplishing remote, automatic, and tillage-depth-responsive adjustments of stabilizer wheel position to be carried out on-the-fly, without the necessity for stopping the towing vehicle, or for the vehicle operator's attention to be diverted from overall operation of the towing vehicle to manually adjust stabilizer wheel position. The invention can readily utilize or be incorporated into existing modern implement control protocols, such as an ISOBUS.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. It is specifically noted that, although the exemplary embodiments of the invention described herein have been primarily directed to positioning a pair of stabilizer wheels, it will be understood that one of the advantages provided by the invention is that it can be readily expanded for practice with more than two stabilizer wheels. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A system for remotely and individually positioning first and second remotely positionable stabilizer wheels operatively attached to and extending in a forward direction from a frame of an agricultural tillage implement having an implement frame supported above a ground surface by implement support wheels rearward of the stabilizer wheels and operatively connected to the frame by a depth control arrangement that sets and maintains a depth of penetration of tillage tools below ground, the system for remotely and individually positioning a plurality of remotely positionable stabilizer wheels comprising:

a first stabilizer wheel control arrangement, a second stabilizer wheel control arrangement, and an all-wheel control arrangement, each of the first and second stabilizer wheel control arrangements and the all-wheel control arrangement defining rod-end and cylinder-end connections thereof that are connected in fluid communication with one another in a parallel circuit arrangement with their respective rod-end connections in fluid communication with one another and their respective cylinder-end connections in fluid communication with one another;

the first stabilizer wheel control arrangement including a first double-acting hydraulic cylinder, operatively connectable to the first remotely positionable stabilizer wheel for respectively positioning the first stabilizer wheel, through extension and retraction of the first hydraulic cylinder, and having a cylinder-end hydraulic port and a rod-end hydraulic port disposed on opposite sides of a piston of the first hydraulic cylinder, with the cylinder-end and rod-end ports thereof being connected respectively in series with the cylinder-end and rod-end connections of the first stabilizer wheel control arrangement;

the first stabilizer wheel control arrangement further including a solenoid-operated first cylinder shut-off valve arrangement and a first cylinder flow restrictor disposed in a series relationship with one another, the first cylinder, and one of the cylinder-end and rod-end connections of the first stabilizer wheel control arrangement;

the second stabilizer wheel control arrangement including a second double-acting hydraulic cylinder, operatively connectable to the second remotely positionable stabilizer wheel for respectively positioning the second stabilizer wheel, through extension and retraction of the second hydraulic cylinder, and having a cylinder-end hydraulic port and a rod-end hydraulic port disposed on opposite sides of a piston of the second hydraulic cylinder, with the cylinder-end and rod-end ports thereof being connected respectively in series with the cylinder-end and rod-end connections of the second stabilizer wheel control arrangement;

the second stabilizer wheel control arrangement further including a solenoid-operated second cylinder shut-off valve arrangement and a second cylinder flow restrictor disposed in a series relationship with one another, the second cylinder, and one of the cylinder-end and rod-end connections of the second stabilizer wheel control arrangement;

the all-wheel control arrangement isolated from the depth control arrangement of the agricultural tillage implement, the all-wheel control arrangement being solenoid operated and configured for selectively supplying a pressurized flow of hydraulic fluid to the first and second cylinders in a first direction to thereby cause extension of the cylinders, and being further configured for supplying a pressurized flow of hydraulic fluid to the first and second cylinders in an opposite direction to thereby cause retraction of the cylinders; and the first and second cylinder shut-off valve arrangements being selectively individually operable independent of the all-wheel control arrangement to thereby stop the flow of hydraulic fluid through the first and second cylinders respectively, for controlling the position of the first and second stabilizer wheels respectively.

2. The system for remotely and individually positioning a plurality of remotely positionable stabilizer wheels of claim 1, further comprising an electronic control unit operatively connected to the solenoids of the first and second cylinder shut-off valve arrangements, and the solenoid of the all-wheel control arrangement, for individually controlling extension and retraction of the first and second hydraulic cylinders through selective actuation of the solenoids of the first and second shut-off valve arrangements and the solenoid of the all-wheel control valve arrangement.

3. The system for remotely and individually positioning a plurality of remotely positionable stabilizer wheels of claim 2, further comprising a first stabilizer wheel position sensor operatively connected to provide an electrical signal indicative of a first stabilizer wheel present position to the electronic control unit, and a second stabilizer wheel position sensor operatively connected to provide an electrical signal indicative of a second stabilizer wheel present position to the electronic control unit, and wherein the electronic control unit is configured for receiving a desired stabilizer wheel position input signal, and is further configured for individually controlling extension and retraction of the first and second cylinders to provide a present stabilizer wheel position for the each of the first and second stabilizer wheels that matches the desired stabilizer wheel position input.

4. The system for remotely and individually positioning a plurality of remotely positionable stabilizer wheels of claim 3, wherein the electronic control unit is further configured to receive first and second desired stabilizer wheel position input signals corresponding to the first and second stabilizer wheels respectively, and is yet further configured for individually controlling extension and retraction of the first and second cylinders to provide a present stabilizer wheel position for the each of the first and second stabilizer wheels that matches the first and second desired stabilizer wheel position inputs respectively.

5. The system for remotely and individually positioning a plurality of remotely positionable stabilizer wheels of claim 2, further comprising a first stabilizer wheel position sensor operatively connected to provide an electrical signal indicative of a first stabilizer wheel present position to the electronic control unit, and a second stabilizer wheel position sensor operatively connected to provide an electrical signal indicative of a second stabilizer wheel present position to the electronic control unit, and wherein the electronic control unit is configured for receiving a desired depth input signal, and is further configured for individually controlling extension and retraction of the first and second cylinders to provide a present stabilizer wheel position for the each of the first and second stabilizer wheels that corresponds to the desired depth input signal.

6. The system for remotely and individually positioning a plurality of remotely positionable stabilizer wheels of claim 5, wherein the electronic control unit is further configured to receive first and second desired stabilizer wheel position input signals corresponding to the first and second stabilizer wheels respectively, and is yet further configured for individually controlling extension and retraction of the first and second cylinders to provide a present stabilizer wheel position for the each of the first and second stabilizer wheels that matches the first and second desired stabilizer wheel position inputs respectively.

7. The system for remotely and individually positioning a plurality of remotely positionable stabilizer wheels of claim 5, wherein the control unit selects a predetermined stabilizer wheel position for the first and second stabilizer wheels corresponding to the desired depth input and controls the hydraulic power source using the predetermined stabilizer wheel position.

8. The system for remotely and individually positioning a plurality of remotely positionable stabilizer wheels of claim 5, wherein the control unit computes a computed desired stabilized wheel position for the first and second stabilizer wheels corresponding to the desired depth input, and controls the hydraulic power source using the computed desired stabilizer wheel position.

9. A towable agricultural tillage implement adapted for attachment to a towing vehicle and having an implement frame supported above a ground surface by implement support wheels operatively connected to the frame by a depth control arrangement to thereby control a depth of penetration below the ground surface of tillage tools attached to the frame, first and second stabilizer wheel arrangements attached to the frame forward of the implement support wheels in a manner providing selective stabilizing support of the implement, and a system for remotely and individually positioning the first and second remotely positionable stabilizer wheels, wherein the system for remotely and individually positioning the first and second remotely positionable stabilizer wheels comprises:

a first stabilizer wheel control arrangement, a second stabilizer wheel control arrangement, and an all-wheel control arrangement, each of the first and second stabilizer wheel control arrangements and the all-wheel control arrangement defining rod-end and cylinder-end connections thereof that are connected in fluid communication with one another in a parallel circuit arrangement with their respective rod-end connections in fluid communication with one another and their respective cylinder-end connections in fluid communication with one another;

the first stabilizer wheel control arrangement including a first double-acting hydraulic cylinder, operatively connectable to the first remotely positionable stabilizer wheel for respectively positioning the first stabilizer wheel, through extension and retraction of the first hydraulic cylinder, and having a cylinder-end hydraulic port and a rod-end hydraulic port disposed on opposite sides of a piston of the first hydraulic cylinder, with the cylinder-end and rod-end ports thereof being connected respectively in series with the cylinder-end and rod-end connections of the first stabilizer wheel control arrangement;

the first stabilizer wheel control arrangement further including a solenoid-operated first cylinder shut-off valve arrangement and a first cylinder flow restrictor disposed in a series relationship with one another, the first cylinder, and one of the cylinder-end and rod-end connections of the first stabilizer wheel control arrangement;

the second stabilizer wheel control arrangement including a second double-acting hydraulic cylinder, operatively connectable to the second remotely positionable stabilizer wheel for respectively positioning the second stabilizer wheel, through extension and retraction of the second hydraulic cylinder, and having a cylinder-end hydraulic port and a rod-end hydraulic port disposed on opposite sides of a piston of the second hydraulic cylinder, with the cylinder-end and rod-end ports thereof being connected respectively in series with the cylinder-end and rod-end connections of the second stabilizer wheel control arrangement;

the second stabilizer wheel control arrangement further including a solenoid-operated second cylinder shut-off valve arrangement and a second cylinder flow restrictor disposed in a series relationship with one another, the second cylinder, and one of the cylinder-end and rod-end connections of the second stabilizer wheel control arrangement;

the all-wheel control arrangement isolated from the depth control arrangement, the all-wheel control arrangement being solenoid operated and configured for selectively supplying a pressurized flow of hydraulic fluid to the first and second cylinders in a first direction to thereby cause extension of the cylinders, and being further configured for supplying a pressurized flow of hydraulic fluid to the first and second cylinders in an opposite direction to thereby cause retraction of the cylinders;

and the first and second cylinder shut-off valve arrangements being individually operable independent of the all-wheel control arrangement to thereby stop the flow of hydraulic fluid through the first and second cylinders respectively, to thereby individually control the position of the first and second stabilizer wheels respectively.

10. The towable agricultural tillage implement of claim 9, wherein the system for remotely and individually positioning a plurality of remotely positionable stabilizer wheels further includes an electronic control unit operatively connected to the solenoids of the first cylinder two-way solenoid operated valve arrangement, the second cylinder two-way operated valve arrangement, and the solenoid of the four-way valve arrangement, for individually controlling extension and retraction of the first and second hydraulic cylinders through selective actuation of the solenoids of the first and second two-way valve arrangements and the solenoid of the four-way valve arrangement.

11. The towable agricultural tillage implement of claim 10, wherein the system for remotely and individually positioning a plurality of remotely positionable stabilizer wheels further includes a first stabilizer wheel position sensor operatively connected to provide an electrical signal indicative of a first stabilizer wheel present position to the electronic control unit, and a second stabilizer wheel position sensor operatively connected to provide an electrical signal indicative of a second stabilizer wheel present position to the electronic control unit, and wherein the electronic control unit is configured for receiving a desired stabilizer wheel position input signal, and is further configured for individually controlling extension and retraction of the first and second cylinders to provide a present stabilizer wheel position for the each of the first and second stabilizer wheels that matches the desired stabilizer wheel position input.

12. The towable agricultural tillage implement of claim 11, wherein the electronic control unit of the system for remotely and individually positioning a plurality of remotely positionable stabilizer wheels is further configured to receive first and second desired stabilizer wheel position input signals corresponding to the first and second stabilizer wheels respectively, and is yet further configured for individually controlling extension and retraction of the first and second cylinders to provide a present stabilizer wheel position for the each of the first and second stabilizer wheels that matches the first and second desired stabilizer wheel position inputs respectively.

13. The towable agricultural tillage implement of claim 10, wherein the system for remotely and individually positioning a plurality of remotely positionable stabilizer wheels further includes a first stabilizer wheel position sensor operatively connected to provide an electrical signal indicative of a first stabilizer wheel present position to the electronic control unit, and a second stabilizer wheel position sensor operatively connected to provide an electrical signal indicative of a second stabilizer wheel present position to the electronic control unit, and wherein the electronic control unit is configured for receiving a desired depth input signal, and is further configured for individually controlling extension and retraction of the first and second cylinders to provide a present stabilizer wheel position for the each of the first and second stabilizer wheels that corresponds to the desired depth input signal.

14. The towable agricultural tillage implement of claim 13, wherein the electronic control unit of the system for remotely and individually positioning a plurality of remotely positionable stabilizer wheels is further configured to receive first and second desired stabilizer wheel position input signals corresponding to the first and second stabilizer wheels respectively, and is yet further configured for individually controlling extension and retraction of the first and second cylinders to provide a present stabilizer wheel position for the each of the first and second stabilizer wheels that matches the first and second desired stabilizer wheel position inputs respectively.

15. A method for remotely and individually positioning first and second remotely positionable stabilizer wheels operatively attached to a frame of an agricultural tillage implement having an implement frame supported above a ground surface by implement support wheels operatively connected to the frame by a depth control arrangement that sets and maintains a depth of penetration of tillage tools below ground, the method for remotely individually positioning a plurality of remotely positionable stabilizer wheels comprising:
  positioning the plurality of stabilizer wheels forward of implement support wheels relative to the frame;
  providing a first stabilizer wheel control arrangement, a second stabilizer wheel control arrangement, and an all-wheel control arrangement, with each of the first and second stabilizer wheel control arrangements and the all-wheel control arrangement defining rod-end and cylinder-end connections thereof that are connected in fluid communication with one another in a parallel circuit arrangement with their respective rod-end connections in fluid communication with one another and their respective cylinder-end connections in fluid communication with one another;
  wherein the first stabilizer wheel control arrangement includes a first double-acting hydraulic cylinder, operatively connectable to the first remotely positionable stabilizer wheel for respectively positioning the first stabilizer wheel, through extension and retraction of the first hydraulic cylinder, and having a cylinder-end hydraulic port and a rod-end hydraulic port disposed on opposite sides of a piston of the first hydraulic cylinder, with the cylinder-end and rod-end ports thereof being connected respectively in series with the cylinder-end and rod-end connections of the first stabilizer wheel control arrangement;
  wherein the first stabilizer wheel control arrangement further includes a solenoid-operated first cylinder shut-off valve arrangement and a first cylinder flow restrictor disposed in a series relationship with one another, the first cylinder, and one of the cylinder-end and rod-end connections of the first stabilizer wheel control arrangements;
  wherein the second stabilizer wheel control arrangement includes a second double-acting hydraulic cylinder, operatively connectable to the second remotely positionable stabilizer wheel for respectively positioning the second stabilizer wheel, through extension and retraction of the second hydraulic cylinder, and having a cylinder-end hydraulic port and a rod-end hydraulic port disposed on opposite sides of a piston of the second hydraulic cylinder, with the cylinder-end and rod-end ports thereof being connected respectively in series with the cylinder-end and rod-end connections of the second stabilizer wheel control arrangement;
  wherein the second stabilizer wheel control arrangement further includes a solenoid-operated second cylinder shut-off valve arrangement and a second cylinder flow restrictor arrangement disposed in a series relationship with one another, the second cylinder, and one of the cylinder-end and rod-end connections of the second stabilizer wheel control arrangements;
  wherein the all-wheel control arrangement is isolated from the depth control arrangement, is solenoid operated and is configured for selectively supplying a pressurized flow of hydraulic fluid to the first and second cylinders in a first direction to thereby cause extension of the cylinders, and being further configured for supplying a pressurized flow of hydraulic fluid to the first and second cylinders in an opposite direction to thereby cause retraction of the cylinders;
  wherein and the first and second cylinder shut-off valve arrangements being individually operable independent of the all-wheel control arrangement to thereby stop the flow of hydraulic fluid through the first and second cylinders respectively, to thereby individually control the position of the first and second stabilizer wheels respectively; and
  selectively and remotely operating the first and second cylinder control arrangements and the all-wheel control arrangement to thereby individually control the position of the first and second stabilizer wheels respectively.

16. The method for remotely and individually positioning a plurality of remotely positionable stabilizer wheels of claim 15, further comprising, operatively connecting an electronic control unit to the solenoids of the first and second cylinder shut-off valve arrangements, and the solenoid of the all-wheel control arrangement, for individually controlling extension and retraction of the first and second hydraulic cylinders through selective actuation of the solenoids of the first and second cylinder shut-off valve arrangements and the solenoid of the all-wheel control valve arrangement.

17. The method for remotely and individually positioning a plurality of remotely positionable stabilizer wheels of claim 16, further comprising, operatively connecting a first stabilizer wheel position sensor to provide an electrical signal indicative of a first stabilizer wheel present position to the electronic control unit, and operatively connecting a second stabilizer wheel position sensor to provide an electrical signal indicative of a second stabilizer wheel present position to the electronic control unit, and configuring the electronic control unit for receiving a desired stabilizer wheel position input signal, and individually controlling extension and retraction of the first and second cylinders to provide a present stabilizer wheel position for the each of the first and second stabilizer wheels that matches the desired stabilizer wheel position input.

18. The method for remotely and individually positioning a plurality of remotely positionable stabilizer wheels of claim 17, further including, configuring the electronic control unit to receive first and second desired stabilizer wheel position input signals corresponding to the first and second stabilizer wheels respectively, and individually controlling extension and retraction of the first and second cylinders with the electronic control unit to provide a present stabilizer wheel position for the each of the first and second stabilizer wheels that matches the first and second desired stabilizer wheel position inputs respectively.

19. The method for remotely and individually positioning a plurality of remotely positionable stabilizer wheels of claim 16, further comprising, operatively connecting a first stabilizer wheel position sensor to provide an electrical signal indicative of a first stabilizer wheel present position to the electronic control unit, and operatively connecting a second stabilizer wheel position sensor to provide an electrical signal indicative of a second stabilizer wheel present position to the electronic control unit, and configuring the electronic control unit for receiving a desired depth input signal, and for individually controlling extension and retraction of the first and second cylinders to provide a present stabilizer wheel position for the each of the first and second stabilizer wheels that corresponds to the desired depth input signal.

20. The method for remotely and individually positioning a plurality of remotely positionable stabilizer wheels of claim 19, further comprising, configuring the electronic control unit to receive first and second desired stabilizer wheel position input signals corresponding to the first and second stabilizer wheels respectively, and for individually controlling extension and retraction of the first and second cylinders to provide a present stabilizer wheel position for the each of the first and second stabilizer wheels that matches the first and second desired stabilizer wheel position inputs respectively.

* * * * *